United States Patent
Gutman et al.

(10) Patent No.: US 12,520,171 B2
(45) Date of Patent: Jan. 6, 2026

(54) MANAGING BLOCKER SIGNAL INTERFERENCE

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/361,463

(22) Filed: Jul. 28, 2023

(65) Prior Publication Data

US 2025/0039691 A1 Jan. 30, 2025

(51) Int. Cl.
*H04W 24/02* (2009.01)

(52) U.S. Cl.
CPC .................................. *H04W 24/02* (2013.01)

(58) Field of Classification Search
CPC ...... H04W 24/02; H04B 1/1027; H04B 1/525
See application file for complete search history.

(56) References Cited

U.S. PATENT DOCUMENTS

| | | | |
|---|---|---|---|
| 7,715,814 B2 | 5/2010 | Manku et al. | |
| 7,873,330 B2 * | 1/2011 | Tudosoiu | H03F 3/24 455/73 |
| 8,718,009 B2 * | 5/2014 | Kuroda | H04L 25/0224 455/562.1 |
| 9,231,685 B2 * | 1/2016 | Hong | H04B 7/0814 |
| 9,872,305 B2 * | 1/2018 | Moshavi | H04W 72/12 |
| 10,965,021 B2 * | 3/2021 | Wloczysiak | H01Q 1/521 |
| 11,563,454 B1 * | 1/2023 | Sharma | H03M 1/0629 |
| 2004/0266472 A1 * | 12/2004 | Ben Rached | H04W 52/40 455/522 |
| 2009/0203341 A1 * | 8/2009 | Mun | H04B 1/525 455/230 |
| 2012/0201172 A1 | 8/2012 | Khlat et al. | |
| 2019/0273314 A1 * | 9/2019 | Wloczysiak | H03H 7/0161 |
| 2019/0394634 A1 * | 12/2019 | Akkarakaran | H04W 88/06 |
| 2021/0184346 A1 * | 6/2021 | Wloczysiak | H04B 1/0057 |
| 2023/0369756 A1 * | 11/2023 | Wloczysiak | H04B 1/0057 |

OTHER PUBLICATIONS

International Search Report and Written Opinion—PCT/US2024/036324—ISA/EPO—Oct. 8, 2024.

* cited by examiner

*Primary Examiner* — Julio R Perez
(74) *Attorney, Agent, or Firm* — Guang Y. Zhang; Patterson & Sheridan LLP

(57) ABSTRACT

Certain aspects of the present disclosure provide techniques for managing blocker signal interference. An example method includes transmitting, to a network entity, capability information indicating a capability of the first wireless communications device to reduce an impact of interference associated with one or more blocker signals, receiving, from the network entity based on the capability information, information indicating the one or more blocker signals are scheduled to overlap in time with one or more data signals to be received by the first wireless communications device, receiving the one or more blocker signals and the one or more data signals, and taking one or more actions to reduce the impact of the interference associated with the one or more blocker signals based on the information indicating the one or more blocker signals are scheduled to overlap in time with one or more data signals.

30 Claims, 12 Drawing Sheets

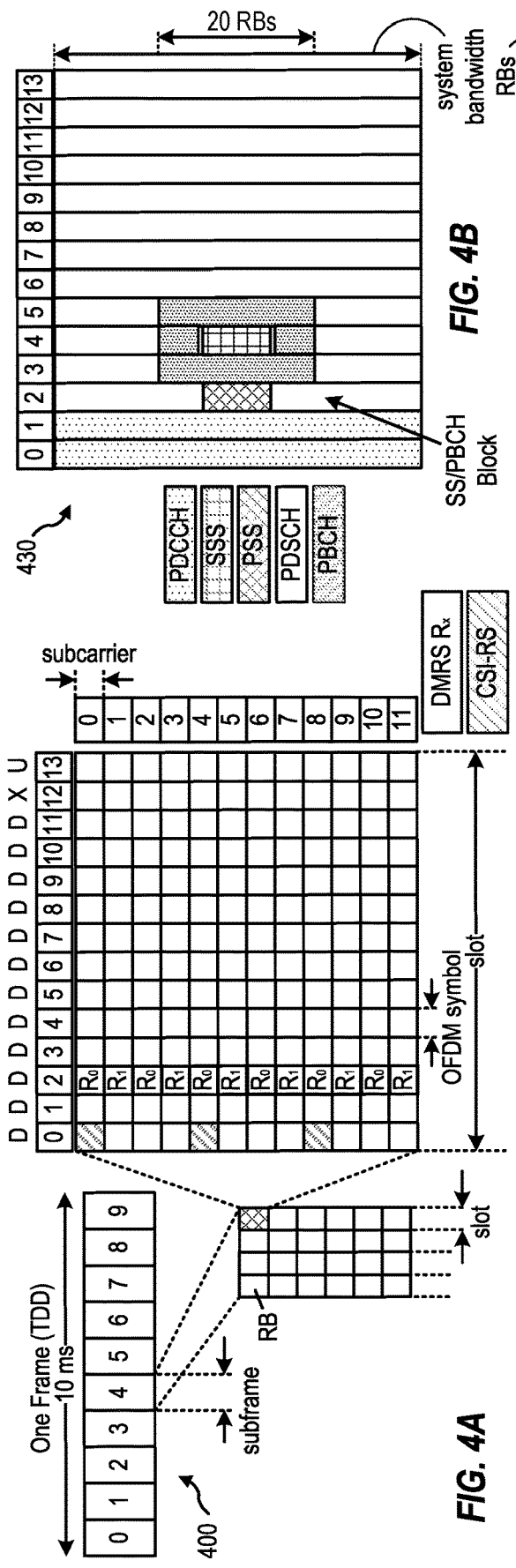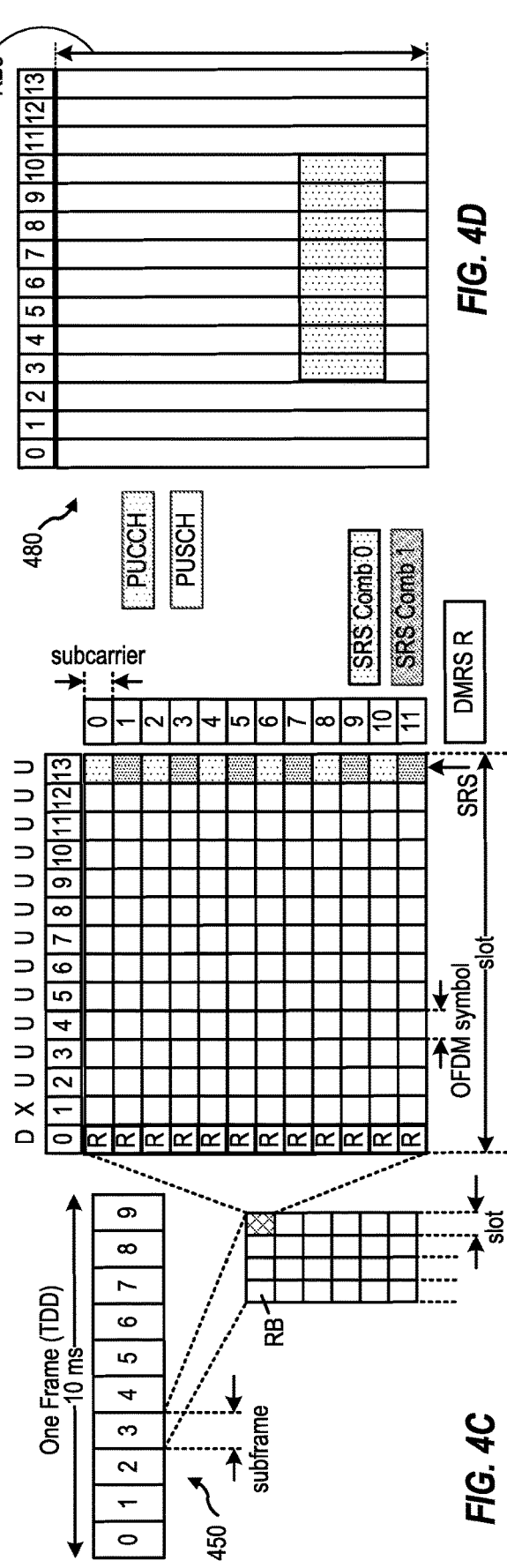

ly have made
MANAGING BLOCKER SIGNAL INTERFERENCE

BACKGROUND

Field of the Disclosure

Aspects of the present disclosure relate to wireless communications, and more particularly, to techniques for managing blocker signal interference.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a first wireless communications device. The method includes transmitting, to a network entity, capability information indicating a capability of the first wireless communications device to reduce an impact of interference associated with one or more blocker signals; receiving, from the network entity based on the capability information, information indicating the one or more blocker signals are scheduled to overlap in time with one or more data signals to be received by the first wireless communications device; receiving the one or more blocker signals and the one or more data signals; and taking one or more actions to reduce the impact of the interference associated with the one or more blocker signals based on the information indicating the one or more blocker signals are scheduled to overlap in time with one or more data signals.

Another aspect provides a method for wireless communication by a network entity. The method includes receiving, from one or more wireless communications devices, capability information indicating capabilities of the one or more wireless communications devices to reduce an impact of interference associated with one or more blocker signals; and transmitting, to at least a first wireless communications device of the one or more wireless communications devices based on the capability information, information indicating the one or more blocker signals are scheduled to overlap in time with one or more data signals to be received by at least the first wireless communications device.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
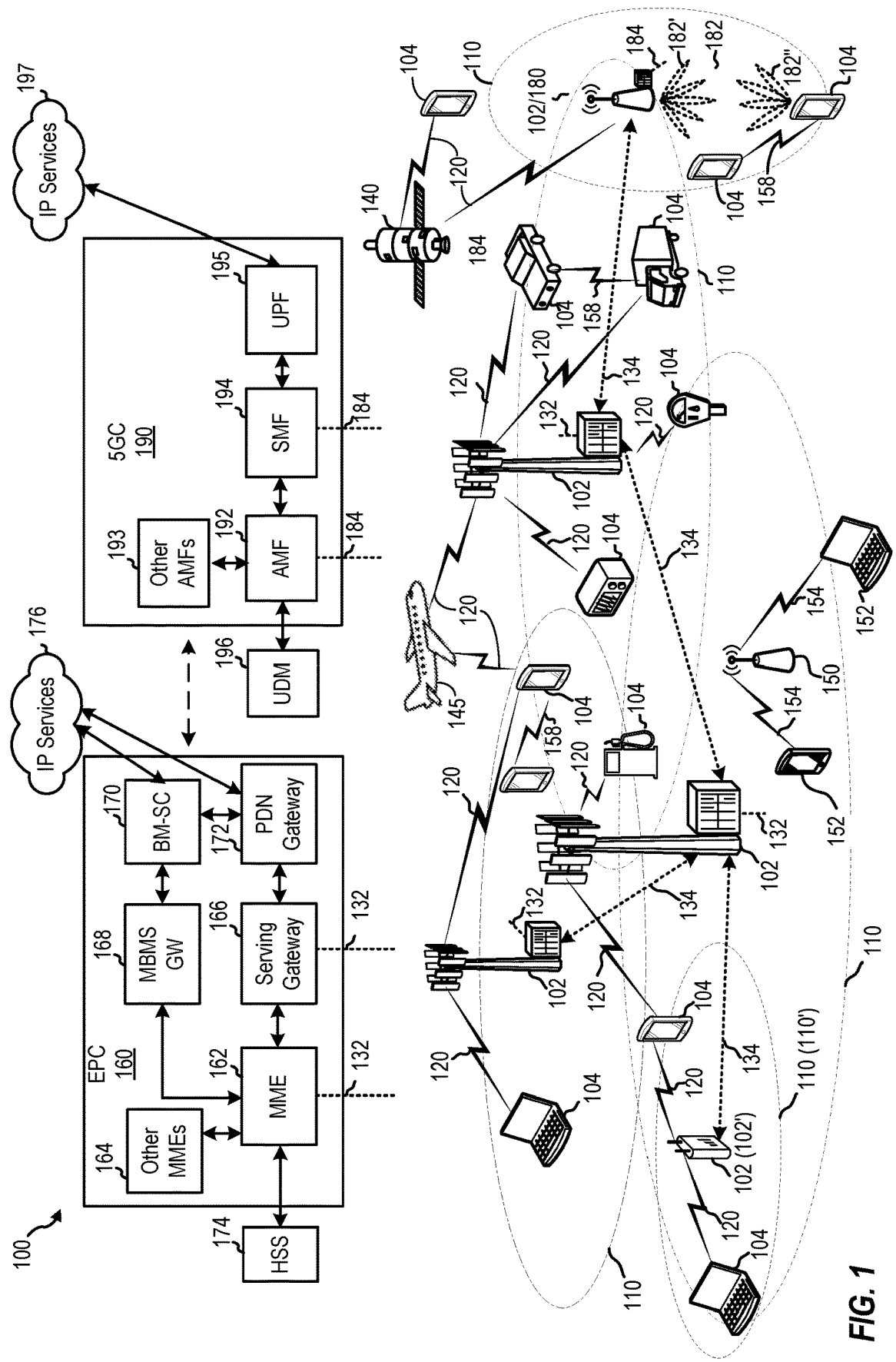
FIG. 1 depicts an example wireless communications network.

Aspects of the present disclosure provide apparatuses, methods, processing systems, and computer-readable mediums for managing interference associated with blocker signals.

For example, in some cases, when receiving one or more data signals intended for a first wireless communications device, the first wireless communications device may also receive external interference caused by one or more blocker signals that are received concurrently with the one or more data signals in a composite analog wireless signal. In some cases, this external interference caused by the one or more blocker signals may lead to several negative effects at the first wireless communications device. For example, in some cases, energy received from the one or more blocker signals due to their transmission power (or power at which they are transmitted) may interact with the one or more data signals intended for the first wireless communications device causing additional signals at frequencies that are the sum or difference of the original frequencies of the blocker signals and data signals to be created.

These additional signals, known as intermodulation products, may cause intermodulation distortion within the first wireless communications device that may force certain components in a receive chain of the first wireless communications device into saturation (e.g., due to certain non-linear characteristics associated with these components). The saturation of these components may reduce a signal to noise ratio (SNR) associated with the one or more data signals intended for the first wireless communications device, which may result in the first wireless communications device being unable to properly decode the one or more data signals. The first wireless communications device would then be forced to transmit feedback information, requesting the one or more data signals be retransmitted, unnecessarily wasting time-frequency resources within a network and power resources at the first wireless communications device.

In some cases, one way to remove or reduce the intermodulation distortion caused by the one or more blocker signals may be to use a linearizer module to remove the non-linear characteristics of the certain components of the first wireless communications device. The first wireless communications device would then be able to remove or reduce the impact of the intermodulation distortion caused by the one or more blocker signals. However, removing the non-linear characteristics and the intermodulation distortion may consume a significant amount of power.

To help limit the amount of power that is consumed associated with removing non-linear characteristics and the intermodulation distortion, aspects of the present disclosure provide techniques that allow the first wireless communications device to dynamically control if and when the first wireless communications device performs operations to remove the non-linear characteristics and the intermodulation distortion.

For example, in some cases, to facilitate this dynamic control, the first wireless communications device may receive information indicating whether one or more blocker signals are scheduled to overlap in time with one or more data signals to be received by the first wireless communications device. In such cases, the techniques provided herein may allow the first wireless communications device to perform the operations to remove the non-linear characteristics/effects and intermodulation distortion caused by the one or more block signals only when the one or more blocker signals are expected to overlap in time with one or more data signals to be received by the wireless communications device. When no blocker signals are expected to overlap in time with the one or more data signals to be received by the wireless communications device, the first wireless communications device may refrain from performing the operations to remove the non-linear characteristics/effects and intermodulation distortion caused by the one or more block signals, allowing the first wireless communications device to conserve power resources.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
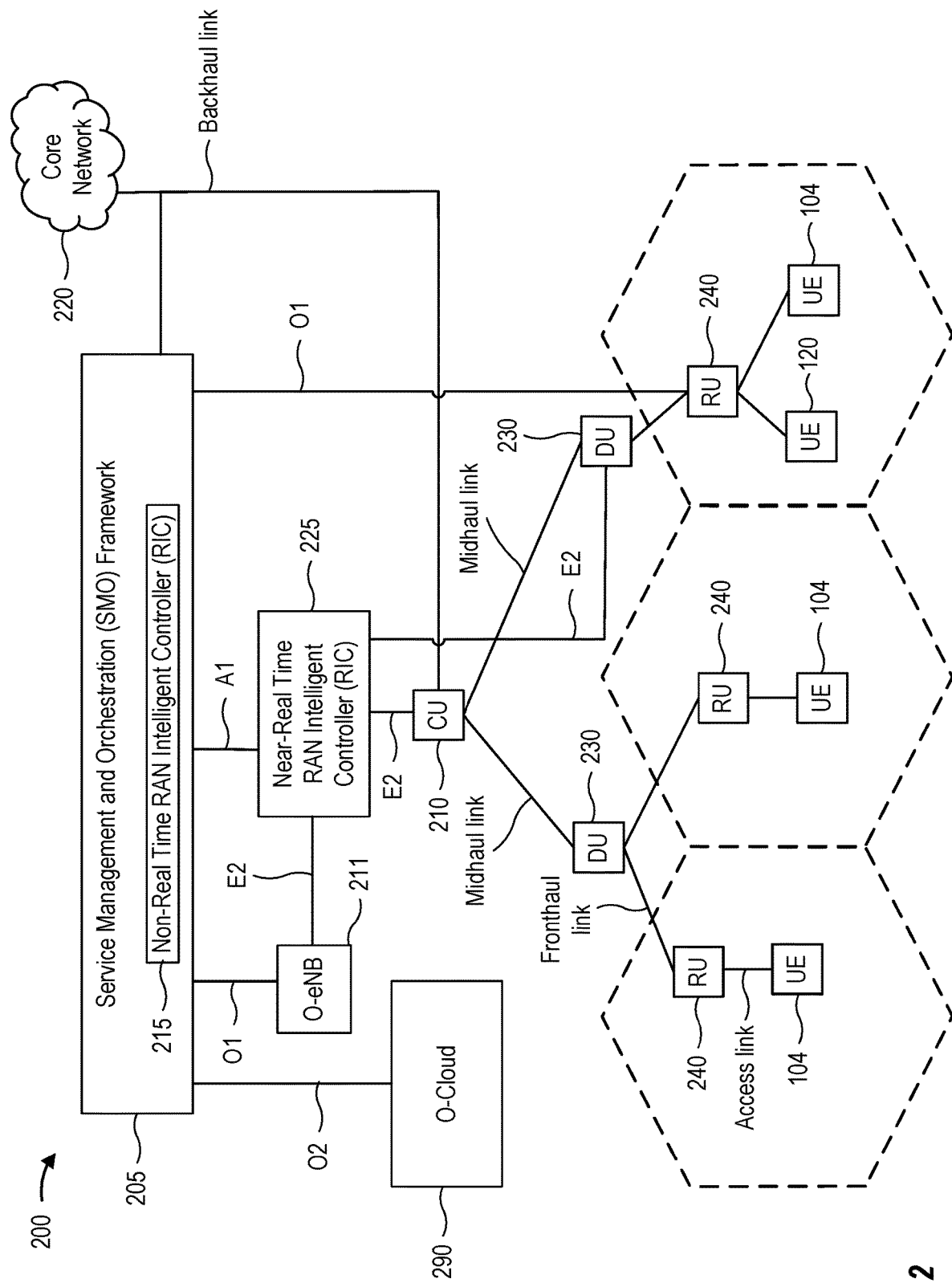
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mm Wave"). In some cases, FR2 may be further defined in terms of sub-ranges, such as a first sub-range FR2-1 including 24,250 MHz-52, 600 MHz and a second sub-range FR2-2 including 52,600 MHZ-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
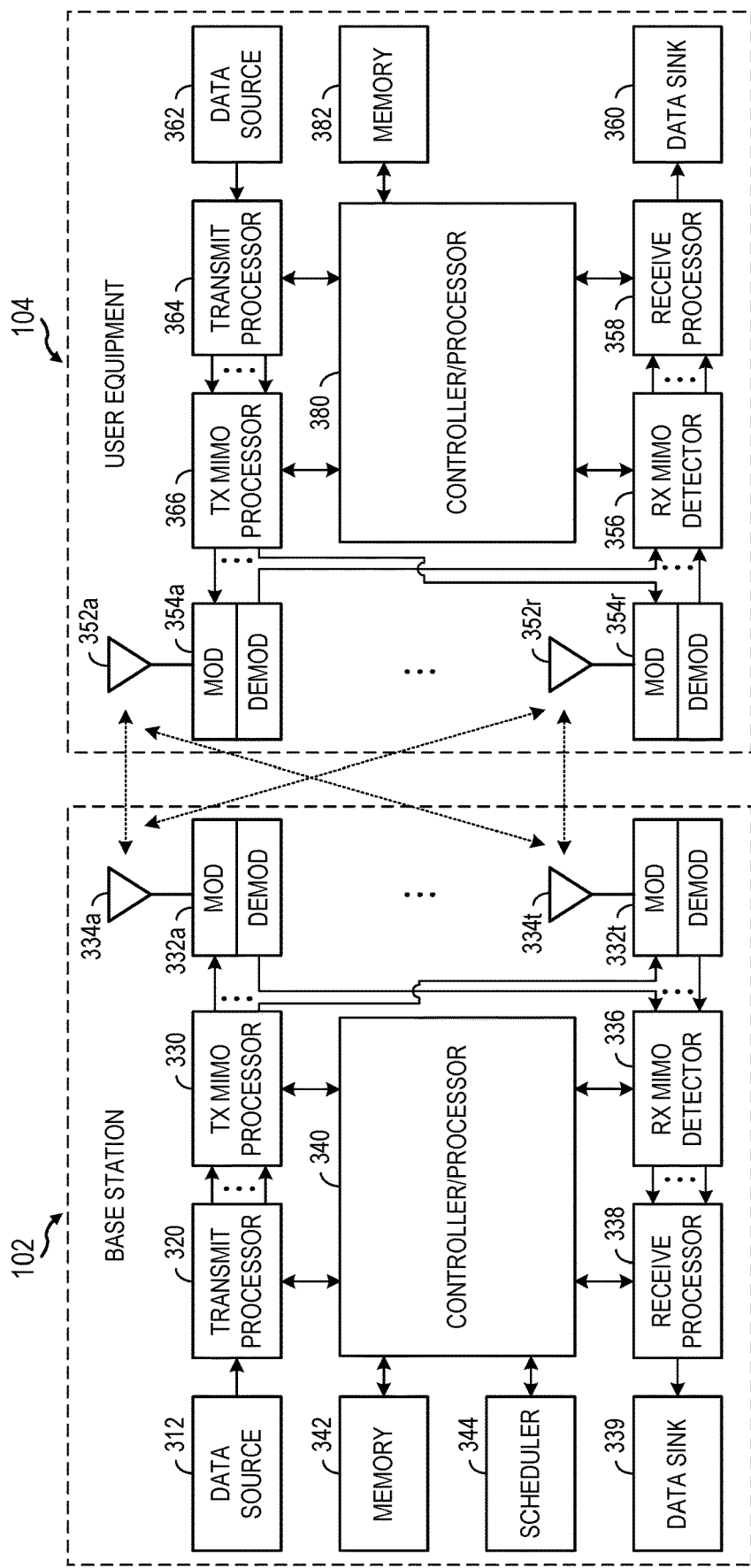
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Transceiver Front End

Figure 5:
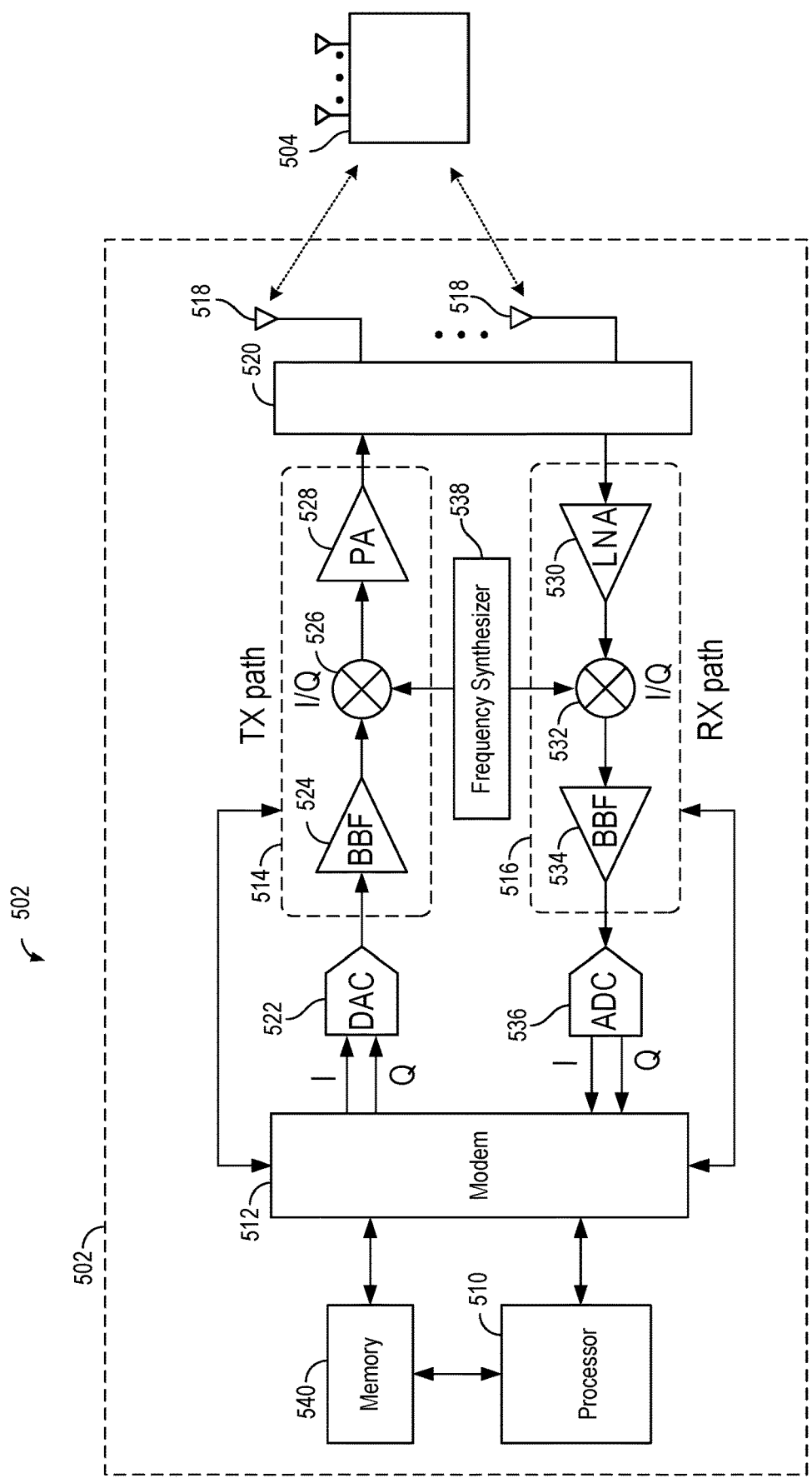
FIG. 5 illustrates example components of a transceiver front end of a first wireless communications device.

FIG. 5 illustrates example components of a transceiver front end 506 of a first wireless communications device 502, which may be used to communicate with a second wireless communications devices 504.

The first wireless communications device 502 may be an example of a user equipment (UE), such as UE 104 described with respect to FIG. 1 and FIG. 3. In some cases, the second wireless communications device 504 may be an example of a network entity, such as BS 102 described with respect to FIG. 1 and FIG. 3 or a disaggregated base station described with respect to FIG. 2.

In some cases, the transceiver front end 506 may be, or may include, a chip, system on chip (SoC), chipset, package or device that includes one or more modems 512. In some cases, the one or more modems 512 may include, for example, any of a WWAN modem (e.g., a modem configured to communicate via E-UTRA and/or 5G NR standards), a WLAN modem (e.g., a modem configured to communicate via 802.11 standards), a Bluetooth modem, a NTN modem, etc. In certain aspects, the first wireless communications device 502 also includes one or more radios (collectively "the radio 550"). In some aspects, the first wireless communications device 502 further includes one or more processors, processing blocks or processing elements (collectively "the processor 510") and one or more memory blocks or elements (collectively "the memory 540").

In certain aspects, the processor 510 may include a processor representative of an application processor that generates information (e.g., application data such as content requests) for transmission and/or receives information (e.g., requested content) via the one or more modems 512. In some cases, the processor 510 may include a microprocessor associated with the one or more modems 512, which process any of certain protocol stack layers associated with a radio access technology (RAT). For example, the processor 510 may process any of an application layer, packet layer, WLAN protocol stack layers (e.g., a link or MAC layer), and/or WWAN protocol stack layers (e.g., a radio resource control (RRC) layer, a packet data convergence protocol (PDCP) layer, a radio link control (RLC) layer, and a MAC layer). In some cases, at least one of the modems 512 (e.g., the WWAN modem) may be in communication with one or more of the other modems 512 (e.g., the WLAN modem and/or Bluetooth modem). For example, the processor 510 may be representative of at least one of the modems 512 in communication with one or more of the other modems 512.

The one or more modems 512 may include an intelligent hardware block or device such as, for example, an application-specific integrated circuit (ASIC) among other possibilities. The one or more modems 512 may generally be configured to implement a physical (PHY) layer. For example, the one or more modems 512 may be configured to modulate packets and to output the modulated packets to the radio 550 for transmission over a wireless medium. The one or more modems 512 is similarly configured to obtain modulated packets received by the radio 550 and to demodulate the packets to provide demodulated packets. In addition to a modulator and a demodulator, the one or more modems 512 may further include digital signal processing (DSP) circuitry, automatic gain control (AGC), a coder, a decoder, a multiplexer and a demultiplexer (not shown).

As an example, while in a transmission mode, the one or more modems 512 may obtain data from the processor 510. The data obtained from the processor 510 may be provided to a coder, which encodes the data to provide encoded bits. The encoded bits may be mapped to points in a modulation constellation (e.g., using a selected modulation and coding scheme) to provide modulated symbols. The modulated symbols may be mapped, for example, to spatial stream(s) or space-time streams. The modulated symbols may be multiplexed, transformed via an inverse fast Fourier transform (IFFT) block, and subsequently provided to DSP circuitry for transmit windowing and filtering. The digital signals may be provided to a digital-to-analog converter (DAC) 522. In certain aspects involving beamforming, the modulated symbols in the respective spatial streams may be precoded via a steering matrix prior to provision to the IFFT block.

The one or more modems 512 may be coupled to the radio 550 including a transmit (TX) path 514 (also known as a transmit chain) for transmitting signals via one or more antennas 518 and a receive (RX) path 516 (also known as a receive chain) for receiving signals via the antennas 518. When the TX path 514 and the RX path 516 share an antenna 518, the paths may be connected with the antenna via an interface 520, which may include any of various suitable RF devices, such as a switch, a duplexer, a diplexer, a multiplexer, and the like. As an example, the one or more modems 512 may output digital in-phase (I) and/or quadrature (Q) baseband signals representative of the respective symbols to the DAC 522.

Receiving I or Q baseband analog signals from the DAC 522, the TX path 514 may include a baseband filter (BBF) 524, a mixer 526 (which may include one or several mixers), and a power amplifier (PA) 528. The BBF 524 filters the baseband signals received from the DAC 522, and the mixer 526 mixes the filtered baseband signals with a transmit local oscillator (LO) signal to convert the baseband signal to a different frequency (e.g., upconvert from baseband to a radio frequency). In some aspects, the frequency conversion process produces the sum and difference frequencies between the LO frequency and the frequencies of the baseband signal. The sum and difference frequencies are referred to as the beat frequencies. Some beat frequencies are in the RF range, such that the signals output by the mixer 314 are typically RF signals, which may be amplified by the PA 528 before transmission by the antenna 518. The antennas 518 may emit RF signals, which may be received at the second wireless communications device 504. While one mixer 526 is illustrated, several mixers may be used to upconvert the filtered baseband signals to one or more intermediate frequencies and to thereafter upconvert the intermediate frequency signals to a frequency for transmission.

The RX path 516 may include a low noise amplifier (LNA) 530, a mixer 532 (which may include one or several mixers), and a baseband filter (BBF) 534. RF signals received via the antenna 518 (e.g., from the second wireless communications device 504) may be amplified by the LNA 530, and the mixer 532 mixes the amplified RF signals with a receive local oscillator (LO) signal to convert the RF signal to a baseband frequency (e.g., downconvert). The baseband signals output by the mixer 532 may be filtered by the BBF 534 before being converted by an analog-to-digital converter (ADC) 536 to digital I or Q signals for digital signal processing. The one or more modems 512 may receive the digital I or Q signals and further process the digital signals, for example, demodulating the digital signals.

Certain transceivers may employ frequency synthesizers with a voltage-controlled oscillator (VCO) to generate a stable, tunable LO frequency with a particular tuning range. Thus, the transmit LO frequency may be produced by a frequency synthesizer 538, which may be buffered or amplified by an amplifier (not shown) before being mixed with the baseband signals in the mixer 526. Similarly, the receive LO frequency may be produced by the frequency synthesizer 538, which may be buffered or amplified by an amplifier (not shown) before being mixed with the RF signals in the mixer 532. Separate frequency synthesizers may be used for the TX path 514 and the RX path 516.

While in a reception mode, the one or more modems 512 may obtain digitally converted signals via the ADC 536 and RX path 516. As an example, in the one or more modems 512, digital signals may be provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also may be coupled with the demodulator, which is configured to extract modulated symbols from the signal and, for example, compute the logarithm likelihood ratios (LLRs) for each bit position of each subcarrier in each spatial stream. The demodulator may be coupled with the decoder, which may be configured to process the LLRs to provide decoded bits. The decoded bits from all of the spatial streams may be fed to the demultiplexer for demultiplexing. The demultiplexed bits may be descrambled and provided to a medium access control layer (e.g., the processor 510) for processing, evaluation, or interpretation.

The processor 510 and/or one or more modems 512 may control the transmission of signals via the TX path 514 and/or reception of signals via the RX path 516. In some aspects, the processor 510 and/or one or more modems 512 may be configured to perform various operations, such as those associated with any of the methods described herein. The processor 510 and/or the one or more modems 512 may include a microcontroller, a microprocessor, an application processor, a baseband processor, a MAC processor, a neural network processor, a digital signal processor (DSP), an application specific integrated circuit (ASIC), a field programmable gate array (FPGA) or other programmable logic device (PLD), discrete gate or transistor logic, discrete hardware components, or any combination thereof. In some cases, aspects of the processor 510 may be integrated with (incorporated in and/or shared with) the one or more modems 512, such as a microcontroller, a microprocessor, a baseband processor, a medium access control (MAC) processor, a digital signal processor, etc. For example, the processor 510 may be representative of a co-processor (e.g., a microprocessor) associated with the one or more modems 512, and the one or more modems 512 may be representative of an ASIC including the baseband processor, MAC processor, DSP, and/or neural network processor. The memory 540 may store data and program codes (e.g., computer-readable instructions) for performing wireless communications as described herein. The memory 540 may be external to the processor 510 and/or the one or more modems 512 (as illustrated) and/or incorporated therein.

FIG. 5 shows an example transceiver design. It will be appreciated that other transceiver designs or architectures may be applied in connection with aspects of the present disclosure. For example, while examples discussed herein utilize I and Q signals (e.g., quadrature modulation), those of skill in the art will understand that components of the transceiver may be configured to utilize any other suitable modulation, such as polar modulation. As another example, circuit blocks may be arranged differently from the configuration shown in FIG. 5, and/or other circuit blocks not shown in FIG. 5 may be implemented in addition to or instead of the blocks depicted.

Aspects Related to Managing Blocker Signal Interference

When communicating in a wireless communications network, the first wireless communications device 502 may receive an analog wireless signal via one or more antennas, such as the one or more antennas 518. Thereafter, the first wireless communications device 502 may pass the analog wireless signal to an analog front end (AFE) of the first wireless communications device 502. The AFE may comprise various analog devices, such as the LNA 530, the mixer 532, the BBF 534, and the ADC 536. After receiving the wireless signal from the one or more antennas, the AFE may be configured to amplify the analog wireless signal and filter out any unwanted noise and interference. The AFE may also be configured to downconvert the analog wireless signal to a lower intermediate frequency (IF) that may be easily processed by the ADC 536. The ADC 536 may be configured to convert the analog wireless signal to a digital signal, which may then be passed to a digital front end (DFE) in the one or more modems 512 of the first wireless communication device 502 for further processing.

For example, after being output by the ADC 536, the DFE may further filter, amplify, and mix the digital signal with local oscillator signals to convert it to a baseband frequency. The digital signal may then passed to digital processing components of the first wireless communications device 502, such as a digital signal processor (DSP), where it is further processed for decoding, demodulation, and other functions.

In some cases, signal-to-noise (SNR) (e.g., a relative strength of a desired signal compared to background noise present in a wireless communications network) may be limited by two types of noises, such as internal noise and external noise. This internal noise may be the result of thermal noise (e.g., kTBFG noise due to one or more components of the first wireless communications device 502 heating up), integrated phase noise (IPN), and analog and digital component impairments of the first wireless communications device 502, such as non-linear distortion.

The external noise may comprise external interference caused by one or more blocker signals that are received by the first wireless communications device 502 concurrently with the analog wireless signal. In some cases, this external interference caused by the one or more blocker signals may lead to several negative effects at the first wireless communications device 502 when receiving the analog wireless signal. For example, the one or more blocker signals may collide with the analog wireless signal (e.g., in a cell edge scenario) and may directly impact the SNR associated with the analog wireless signal received by the first wireless communications device 502. In other cases, the one or more blocker signals may be orthogonal in frequency to the analog wireless signal received by the first wireless communications device. However, in this case, energy of the one or more blocker signals may force the AFE of the first wireless communications device 502 into saturation, which may limit SNR associated with the analog wireless signal received by the first wireless communications device 502 by introducing third-order intermodulation distortion (IM3) in the AFE.

IM3 is a type of nonlinear distortion that can occur in electronic systems and components, such as amplifiers or mixers, when two or more high-power signals are received, such as the analog wireless signal and the one or more blocker signals. In some cases, this may occur, for example, when a specific base station (e.g., gNB) transmits, using a same beam to two different UEs and one of the UEs has lower link budget than the other. When high-power signals are combined in a nonlinear system, these signals may create additional signals at frequencies that are the sum or difference of the original frequencies. These additional signals are called intermodulation products, and the distortion they create is called intermodulation distortion. IM3 is a specific type of intermodulation distortion that occurs at the third-order frequency difference between the two original signals. IM3 can cause unwanted signals to be generated at frequencies that interfere with the desired signals, leading to degradation of the system performance.

In some cases, IM3 of the AFE may play a noticeable role in maximizing the total SNR. This may be achieved by optimizing the tradeoff between kTBFG noise (e.g., internal noise) and the IM3 (e.g., external noise) of the AFE. In some cases, this tradeoff may be controlled by an outer loop of an automatic gain controller (AGC) of the first wireless communications device 502. For example, to maximize SNR, the AGC may be configured to select a gain state (GS) of the AFE that optimizes the tradeoff between kTBFG noise and the IM3, based on synchronization signal block (SSB) or tracking reference signal (TRS) power measurements, which may or may not include external interference.

Figure 6B:
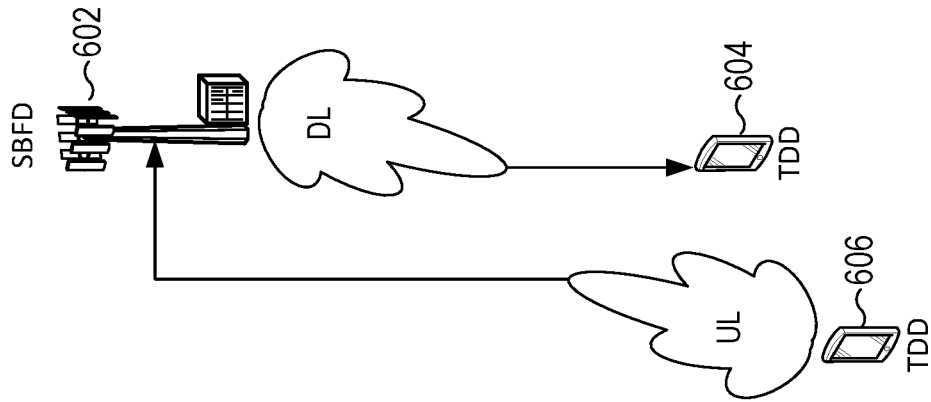
FIGS. 6A and 6B illustrate different scenarios in which intermodulation distortion may occur based on the transmission of the one or more blocker signals.
Figure 6A:
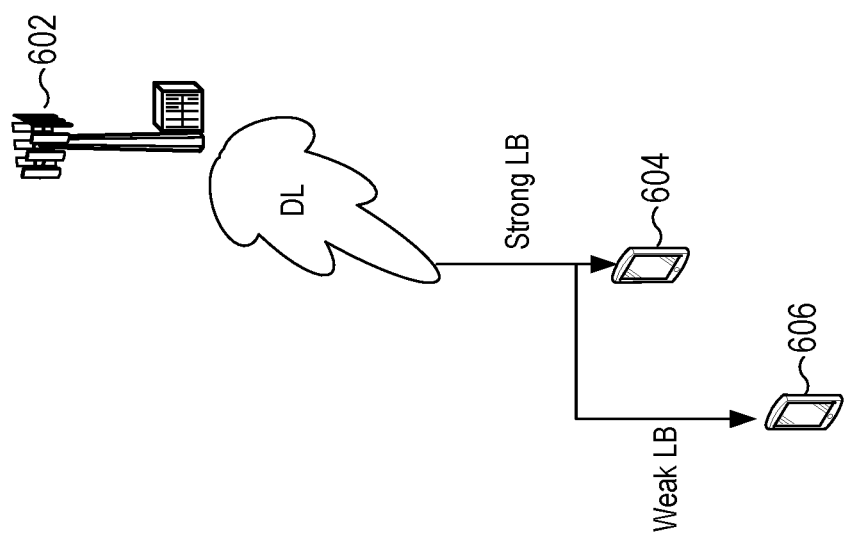

As noted above, IM3 noise/distortion in the AFE of the first wireless communications device 502 may occur when the one or more blocker signals are received at the same time as the analog wireless signal intended for the first wireless communications device. FIGS. 6A and 6B illustrate two different scenarios in which IM3 noise/distortion may occur based on the transmission of the one or more blocker signals.

For example, a first scenario illustrated in FIG. 6A involves a network entity 602 (e.g., BS 102) transmitting wireless signals to a first UE 604 and a second UE 606 having different link budgets. For example, the first UE 604 may have a high/strong link budget (LB) while the second UE 606 may have low/weak link budget. Due to the different link budgets, the network entity 602 may transmit the wireless signals to the first UE 604 and the second UE 606 on a same transmit beam using different transmit powers. For example, when transmitting the wireless signals to the first UE 604, the network entity 602 may not need to use a full transmit power since the link budget for the first UE 604 is high and, as such, power-per-tone may be reduced to conserve power. Conversely, when transmitting the wireless signals to the second UE 606, the network entity 602 may need to use a full transmit power since the link budget for the second UE 606 is low. As a result of the high transmit power used to transmit the wireless signals to the second UE 606, the wireless signals transmitted to the second UE 606 may act as blocker signals to the wireless signals received by the first UE 604, causing non-linear distortion (e.g., IM3 noise/distortion) at an AFE of the first UE 604.

A first scenario illustrated in FIG. 6B involves subband full duplex (SBFD) communication between the network entity 602 and the first UE 604 and the second UE 606. For example, as shown, in some cases, the network entity 602 may be capable of transmitting downlink signals to the first UE 604 and, at the same time, receiving uplink signals from the second UE 606. In some cases, because the second UE 606 is located further away from the network entity 602 as compared to the first UE 604, the uplink signals may be transmitted by the second UE 606 at a high transmit power. As a result of the high transmit power used to transmit the uplink signals to network entity 602, the uplink signals transmitted to the network entity 602 may act as blocker signals to the downlink signals received by the first UE 604, causing non-linear distortion (e.g., IM3 noise/distortion) at an AFE of the first UE 604.

Figure 7:
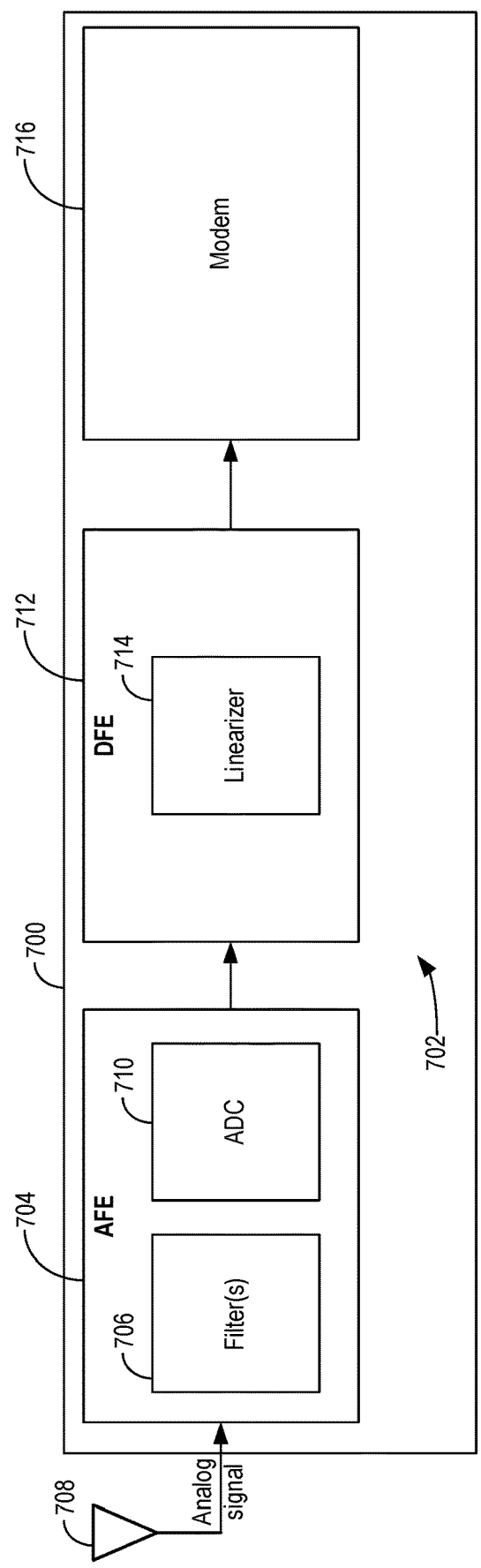
FIG. 7 illustrates a receive chain of a user equipment.

Generally, blocker signals may be filtered out by one or more components of the AFE of a UE, such as the UE 700 illustrated in FIG. 7. For example, FIG. 7 illustrates a receive chain 702 of the UE 700, including an AFE 704, digital front end (DFE) 712, and modem 716. The UE 700 may be an example of the UE 104, the first UE 604, or any other UE described herein. In some cases, the receive chain 702 may be an example of the RX path 516 illustrated in FIG. 5.

In some cases, blocker signals received by the UE 700 may be filtered out by filter(s) 706, which may include one or more of a spatial combining component an inter frequency band pass filter (IF BPF), or a base band low pass filter (BB LPF). However, this filtering may not remove non-linear IM3 distortion that these blocker signals produce in the AFE 704, since the intermod between the wireless signals intended for the UE 700 and the blocker signals may fall (partially or entirely) on a bandwidth of the wireless signals intended for the first UE 604 due to the following, or any other, combination: $f\_intermod = 2 \cdot f\_1 - f\_2 \cdot f\_intermod = 2 \cdot f\_2 - f\_1$, where $f\_intermod$ is a frequency of the intermod, $f\_1$ is a frequency of a wireless signal intended for the wireless communications device, and $f\_2$ is a frequency of the blocker signals.

In some cases, a point at which the non-linearity and IM3 distortion of the AFE 702 begins to occur may be known as an output third order intercept point (OIP3). For example, OIP3 is a measure of the maximum power level at which a device, such as the AFE, may operate before the onset of IM3 distortion. OIP3 may be defined as the output power level at which the third-order intermodulation products generated by the AFE are equal in amplitude to fundamental signals received by the AFE. In other words, it is the power level at which the AFE's output intercepts a line that is 3 times the frequency difference between two input signals (e.g., the one or more blocker signal and the analog wireless signal).

OIP3 is a key parameter in the design of high-performance RF systems and components, as it provides an indication of the linearity and distortion performance of a device, such as the AFE 702. A high OIP3 indicates that a device can handle high-power signals without generating significant levels of intermodulation distortion, while a low OIP3 indicates that the device may be prone to generating significant levels of IM3 distortion at high input power levels.

As can be seen, the non-linear characteristics of the AFE 702 may depend on OIP3. One manner of reducing these non-linear characteristics may be to increase OIP3 and therefore increase the linear dynamic range of the AFE 702, but this may result in a significant increase in power consumption. Another manner of reducing or eliminating these non-linear characteristics may involve using a linearizer configured to determine a function of the non-linearity of the AFE and remove its effects on received signals.

For example, as shown in FIG. 7, the UE 700 includes an antenna 708 that may be used to receive one or more analog signals. After being received, the one or more analog signals may be provided to the AFE 704 for filtering by the filter(s) 706. In some cases, the filter(s) 706 may be configured to filter out certain frequencies from the analog signal that fall outside of a filter bandwidth of the filter(s) 706. Thereafter, the filtered analog signal may be provided to an analog-to-digital converter (ADC) 710 configured to convert the filtered analog signal to a digital signal according to a particular ADC sampling rate (e.g., a rate at which the ADC 710 samples the filtered analog signal and converts it into a digital representation). The digital signal may then be provided to a digital front end (DFE) 712 of the first UE 604 for further processing before being provided to the modem 716.

In some cases, the analog signal received by the UE 700 may include one or more signals intended for the UE 700 as well as one or more blocker signals not intended for the UE 700. These blocker signals, when received with the one or more signals intended for the UE 700, may create additional signals at frequencies that are the sum or difference of the frequencies at which the one or more signals intended for the UE 700 and the one or more blocker signals are received at. As noted above, these additional signals are called intermodulation products and may cause intermodulation distortion and non-linearities in the AFE 704, negatively effecting an ability of the UE 700 to properly receive, process, and recover the one or more signals intended for the UE 700 in the received analog signal.

One way to help reduce or eliminate the intermodulation distortion and non-linearities may be to use a linearizer, such as the linearizer 714 in the DFE 712. For example, in some cases, the linearizer 714 may be configured to determine a function of the non-linearity of the AFE 704 (e.g., caused by the one or more blocker signals) and remove its effects on received analog signal. One manner to ensure that the linearizer 714 is able to remove the non-linear effects of the AFE 704 in the analog signal is to increase a filter bandwidth of the filter(s) 706 to ensure that the intermodulation-producing signals (e.g., the one or more blocker signals) are not filtered out of the received analog signal during processing by the AFE 704. Additionally, the ADC sampling rate of the ADC 710 may need to be increased so that the one or more blocker signals are contained within the digital signal provided to the DFE 712 and so that the linearizer 714 may properly determine the function of the non-linearities in order to remove them. For example, if the ADC sampling rate is not be increased, the one or more blocker signals may "alias" into the received analog signal, rendering the linearizer useless.

However, increasing the filter bandwidth and the ADC sampling rate to allow the linearizer 714 to properly remove the intermodulation distortion and non-linearities may consume a significant amount of power, especially if the UE 700 were to be configured to continuously increase the filter bandwidth and ADC sampling rate.

Accordingly, aspects of the present disclosure provide techniques to help reduce the power consumption associated with removing intermodulation distortion and non-linearities described above. For example, in some cases, these techniques may allow a wireless communications device, such as the UE 700, dynamically control when the wireless communications device increases the filter bandwidth and ADC sampling rate. For example, in some cases, to facilitate this dynamic control, the wireless communications device may receive information indicating whether one or more blocker signals are scheduled to overlap in time with one or more data signals to be received by the wireless communications device. In such cases, the techniques provided herein may allow the wireless communications device to increase the filter bandwidth and ADC sampling rate to allow a linearizer to remove non-linear effects caused by the one or more block signals only when the one or more blocker signals are expected to overlap in time with one or more data signals to be received by the wireless communications device. When no blocker signals are expected to overlap in time with the one or more data signals to be received by the wireless communications device, the wireless communications device may maintain the filter bandwidth and ADC sampling rate at a default or normal level as no non-linear effects are expected. Additional details regarding these techniques are described with respect to FIG. 8, below.

Example Operations of Entities in a Communications Network

Figure 8:
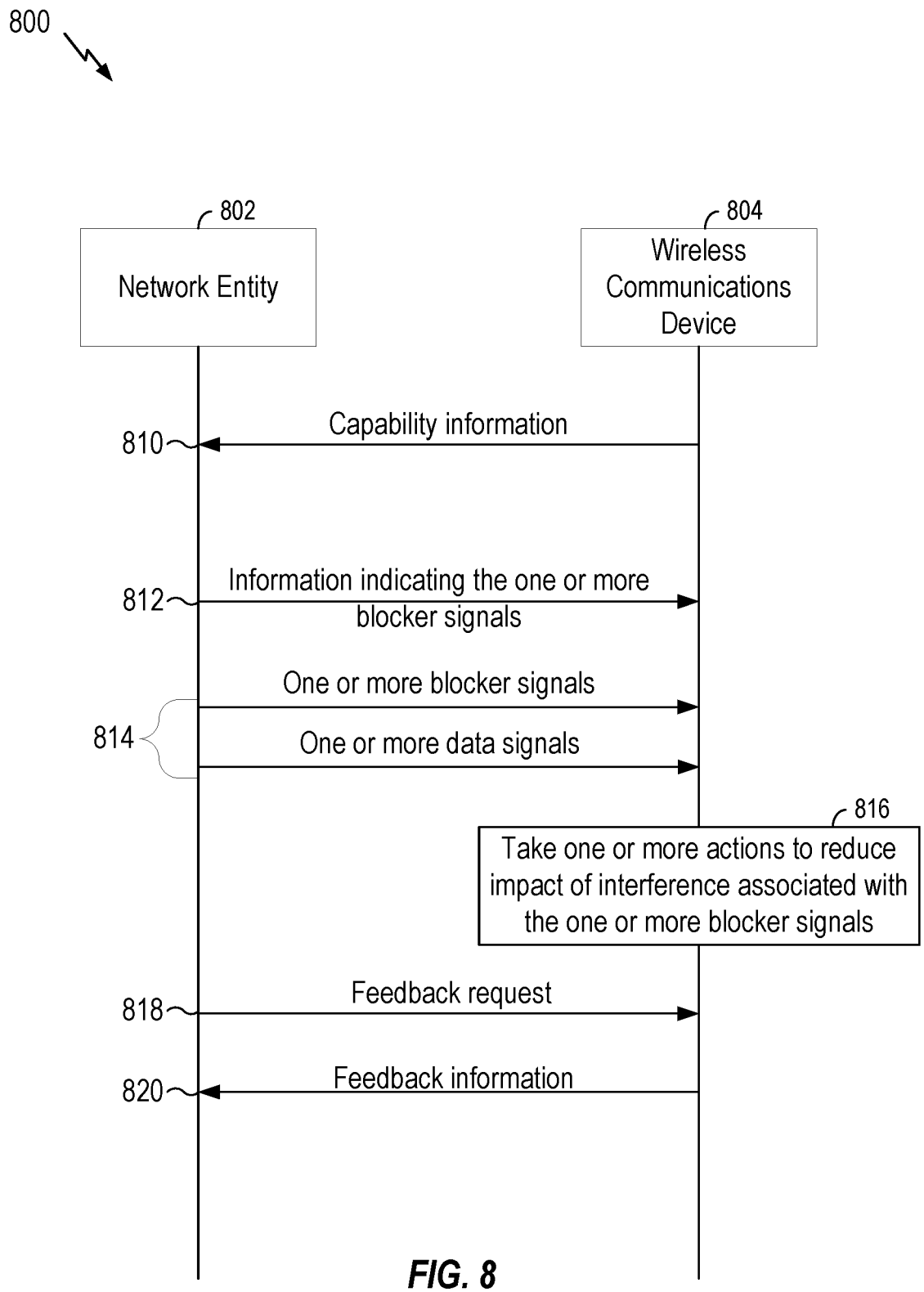
FIG. 8 depicts a process flow for communications in a network between a network entity and a first wireless communications device.

FIG. 8 depicts a process flow including operations 800 for communications in a network between a network entity 802 and a first wireless communications device 804. In some aspects, the network entity 802 may be an example of the BS 102 depicted and described with respect to FIGS. 1 and 3 or a disaggregated base station depicted and described with respect to FIG. 2. Similarly, the first wireless communications device 804 may be an example of UE 104 depicted and described with respect to FIGS. 1 and 3. However, in other aspects, UE 104 may be another type of wireless communications device and BS 102 may be another type of network entity or network node, such as those described herein.

As shown, operations 800 begin at 810 with the first wireless communications device 804 transmitting, to the network entity 802, capability information indicating a capability of the first wireless communications device 804 to reduce an impact of interference associated with one or more blocker signals. In some cases, the first wireless communications device 804 may transmit the capability information in a radio resource control (RRC) message.

Such interference may include, for example, at least intermodulation distortion caused by an overlapping reception of the one or more blocker signals and one or more data signals intended for the first wireless communications device 804. In other words, the capability information may indicate a capability of the first wireless communications device 804 to be able to reduce an impact of intermodulation distortion associated with the one or more blocker signals. For example, in some cases, the first wireless communications device 804 may indicate that the first wireless communications device 804 includes a linearizer (e.g., linearizer 714) that is capable of linearizing a non-linear response of an AFE (e.g., AFE 704). In some cases, the capability information may indicate that the first wireless communications device 804 is capable of increasing a filter bandwidth of a filter (e.g., filter(s) 706) in the AFE of the first wireless communications device 804 and/or an ADC sampling rate of an ADC (e.g., ADC 710) in the AFE of the first wireless communications device 804.

In some cases, the capability information may indicate certain characteristics of the one or more blocker signals that the first wireless communications device 804 is capable of handling. For example, in some cases, the first wireless communications device 804 may indicate a maximum bandwidth in which the first wireless communications device 804 is capable of receiving the one or more blocker signals and reducing the impact of the interference. In some cases, the maximum bandwidth may be indicated as centered around a center frequency associated with the one or more data signals to be received by the first wireless communications device. In some cases, the maximum bandwidth may be indicated as an absolute value above (e.g., to the right of) and below (e.g., to the left of) a center frequency associated with the one or more data signals to be received by the first wireless communications device 804.

In some cases, the capability information may indicate a power threshold relative to a power associated with the one or more data signals to be received by the first wireless communications device 804 and above which the first wireless communications device 804 is configured to take one or more actions to reduce the impact of the interference associated with the one or more blocker signals. In some cases, the power threshold may comprise a threshold equal to or above which a transmission power of the one or more blocker signals may begin to cause the interference (e.g., a non-linear response within the AFE of the first wireless communications device 804).

Thereafter, as shown at 812 in FIG. 8, the first wireless communications device 804 receives, from the network entity 802 based on the capability information, information indicating the one or more blocker signals are scheduled to overlap in time with one or more data signals to be received by the first wireless communications device 804. In some cases, the network entity may transmit this information in downlink control information (DCI) (e.g., layer 1 (L1) signaling) or in a media access control-control element (MAC-CE) (e.g., layer 2 (L2) signaling).

In some cases, the information indicating the one or more blocker signals may be based on information received from another network entity associated with a different cell relative to the network entity 802. For example, in the case of static or semi-static resource allocations, the other network entity may send information to the network entity 802 indicating resource allocations associated with wireless communications devices in the different cell. This information received from the other network entity may allow the network entity 802 to determine the resources on which the one or more blocker signals are expected to overlap in time with the one or more data signals and provide this information to the first wireless communications device 804.

In some cases, the capability information may enable to network entity 802 to know when to transmit the information indication the one or more blocker signals. For example, based on the capability information, when the one or more blocker signals are scheduled to within the maximum bandwidth indicated within the capability information and/or will be transmitted with a transmission power greater than or equal to the power threshold indicated in the capability information (e.g., and are scheduled to overlap in time with the one or more data signals), the network entity 802 may be configured to transmit the information indicating the one or more blocker signals are scheduled to overlap in time with one or more data signals.

In some cases, the information transmitted by the network entity 802 may indicate certain characteristics associated with the one or more blocker signals, such as at least one of (1) a length of time that the one or more blocker signals will be transmitted, (2) a power of the one or more blocker signals relative to a power of the one or more data signals to be received the first wireless communications device, (3) a frequency location that the one or more blocker signals will be transmitted, or (4) an indication that the one or more blocker signals will be transmitted within a particular bandwidth around the one or more data signals to be received by the first wireless communications device. In some cases, the length of time that the one or more blocker signals will be transmitted may be indicated as a number of slots. For example, in some cases, the network entity 802 may indicate that in the next X number of slots, the one or more blocker signals are expected to overlap in time with the one or more data signals. In some cases, the number of slots may be discontinuous. In some cases, the number of slots are semi-persistently scheduled or periodically scheduled.

In some cases, if the capability information received from the first wireless communications device 804 indicates that the first wireless communications device 804 lacks the capability to reduce an impact of interference associated with one or more blocker signals (e.g., is unable to reduce the intermodulation distortion by linearizing the AFE's response), the network entity 802 may refrain from indicating characteristics of the one or more blocker signals but may still indicate that the one or more blocker signals are scheduled to overlap in time with the one or more data signals. In some cases, the first wireless communications device 804 may still exploit this information to increase a receiver or filter bandwidth in order to avoid aliasing of the one or more blocker signals if for some reason the base band filtering within the AFE is not able to filter the one or more blocker signals.

In some cases, while network entity 802 may be configured to transmit such information, the network entity 802 may not need to know whether or how this information will be used at the first wireless communications device 804. The transmission of this information may be generic signaling (e.g., the network entity 802 may be configured to always transmit this information regardless of the capability information received from wireless communications devices, such as the first wireless communications device 804) to indicate information regarding the one or more blocker signals such as time-frequency resource allocation, transmission power, and other information described above.

In some cases, the first wireless communications device 804 may or may not ignore the information received from the network entity 802 regarding the one or more block signals if, for example, (1) the first wireless communications device 804 is in a low power mode and cares more about power consumption rather than spectral efficiency and/or (2) if an expected signal to noise ratio (SNR) degradation due to intermodulation distortion associated with the one or more blocker signals is not that severe (e.g., below a particular intermodulation distortion threshold) when a required total SNR is low (e.g., due to a low modulation and coding scheme (MCS) associated with the one or more data signals).

As illustrated at 814 in FIG. 8, the first wireless communications device 804 may receive the one or more blocker signals and the one or more data signals. In some cases, the one or more blocker signals and the one or more data signals may be received in a composite analog signal. In some cases, while the one or more blocker signals and the one or more data signals are illustrated as being received from the network entity 802 in FIG. 8, the one or more blocker signals and the one or more data signals may be received from the same or different network entities or wireless communications devices within the network.

Thereafter, at 816, the first wireless communications device 804 may take one or more actions to reduce the impact of the interference associated with the one or more blocker signals based on the information indicating the one or more blocker signals are scheduled to overlap in time with one or more data signals. For example, in some cases, the first wireless communications device 804 may be configured to use the information indicating (characteristics of) the one or more blocker signals to "open" it's AFE and DFE operational window, and therefore would be able to reduce IM3 intermodulation distortion.

For example, in some cases, taking the one or more actions to receive the one or more data signals at 816 may include increasing a bandwidth associated with a baseband filter of an AFE of the first wireless communications device (e.g., AFE 704 illustrated in FIG. 7) to include the one or more blocker signals. In other words, the first wireless communications device 804 may widen its base band filter (e.g., BBF 534 illustrated in FIG. 5 and/or filter(s) 706 illustrated in FIG. 7) such that the one or more blocker signals are not filtered out of the receive composite analog signal (e.g., including the one or more blocker signals and the one or more data signals). In other words, increasing the bandwidth associated with a baseband filter allows the one or more blocker signals to not be filtered out by the AFE from a bandwidth associated with the one or more data signals to be received by the first wireless communications device 804.

In some cases, the first wireless communications device 804 may be configured to increase the filter bandwidth to a bandwidth that is just sufficient enough to include the one or more blocker signals and to ensure the one or more blocker signals are not filtered out by the AFE of the first wireless communications device 804. In other words, the first wireless communications device 804 may not need to increase the filter bandwidth to a bandwidth that is significantly larger than is required to capture the one or more blocker signals, which would otherwise consume additional power at the first wireless communications device 804.

Additionally or alternatively, in some cases, taking the one or more actions to receive the one or more data signals at 816 may include increasing a sampling rate of an ADC of the AFE of the first wireless communications device 804 (e.g., ADC 536 illustrated in FIG. 5 and/or ADC 710 illustrated in FIG. 7). Additionally or alternatively, taking the one or more actions to receive the one or more data signals at 816 may include increasing a sampling rate of a DFE of the first wireless communications device 804. In some cases, increasing the sampling rate of the ADC and the sampling rate of the DFE my avoid the one or more blocker signals aliasing into the composite analog signal, which would otherwise render the linearizer useless as information regarding the non-linearities introduced by the one or more blocker signals would be lost.

In some cases, the first wireless communications device may then linearize a response of the AFE and reduce the impact of the interference associated with the one or more blocker signals based on the increased bandwidth, ADC rate, and/or DFE sampling rate, for example, by using a linearizer of the DFE of the first wireless communications device 804 (e.g., linearizer 714 of the DFE 712 illustrated in FIG. 7). Accordingly, in some cases, taking the one or more actions at 816 in FIG. 8 to reduce the impact of the interference associated with the one or more blocker signals may further include the first wireless communications device 804 linearizing a non-linear response of the AFE caused the one or more blocker signals and reducing the impact of the interference associated with the one or more blocker signals caused to the one or more data signals based on the linearizing non-linear response of the AFE. In some cases, linearizing the non-linear response of the AFE may include determining a function of the non-linear response and applying another function to remove the non-linear response. In some cases, the other function that may be applied to remove the non-linear response may comprise, for example, an inverse of the function of the non-linear response or some other function.

In some cases, the network entity 802 may request feedback from the first wireless communications device 804 indicating whether the first wireless communications device 804 was able to successfully remove the interference impact (e.g., intermodulation distortion) associated with the one or more blocker signals. For example, as illustrated at 818, the first wireless communications device 804 may receive, from the network entity 802, a request for feedback indicating whether the first wireless communications device was successful in reducing the impact of the interference associated with the one or more blocker signals.

As shown at 820, in response to the feedback request, the first wireless communications device 804 may transmit feedback information to the network entity 802. In some cases, the feedback may indicate an SNR associated with the one or more data signals after linearizing the non-linear response of the AFE and reducing the impact of the interference associated with the one or more blocker signals. In some cases, the feedback may indicate an SNR associated with the one or more data signals prior to the linearizing non-linear response of the AFE and reducing the impact of the interference associated with the one or more blocker signals. In some cases, the feedback information may indicate a difference between the SNR associated with the one or more data signals after linearizing the non-linear response of the AFE and the SNR associated with the one or more data signals prior to the linearizing non-linear response of the AFE.

In some cases, based on capability information received from wireless communications device within the network, the network entity 802 may be configured to schedule resources for the one or more blocker signals and one or more data signals in a manner that they do not interfere with each other (e.g., cause intermodulation distortion). In other words, the network entity 802 may be configured to schedule the one or more data signals for the first wireless communications device 804 and/or schedule the one or more blocker signals based on the capability information.

For example, in some cases, in some cases, the network entity 802 may schedule frequency resources for the one or more data signals such that wireless communications devices, including the first wireless communications device 804, that are capable of managing AFE compression (e.g., reducing intermodulation distortion) may be scheduled next to frequency resources for the one or more blocker signals while wireless communications devices that are not capable of managing AFE compression (e.g., reducing intermodulation distortion) may be scheduled away from the frequency allocations for the one or more blocker signals.

For example, in some cases, when, based on the capability information received at 810, the first wireless communications device 804 is capable of reducing the impact of interference associated with one or more blocker signals, the network entity 802 may schedule the one or more data signals for the first wireless communications device 804 on frequency resources adjacent frequency resources used for transmission of the one or more blocker signals in frequency or vice versa. Additionally, in some cases, when, based on the capability information, the first wireless communications device 804 is not capable of reducing the impact of interference associated with one or more blocker signals, the network entity 802 may schedule the one or more data signals for the first wireless communications device 804 on frequency resources to be non-adjacent to the frequency resources used for transmission of the one or more blocker signals in frequency or vice versa.

In some cases, the network entity 802 may perform the schedule described above based on different parameters. For example, in some cases, scheduling the one or more data signals for the first wireless communications device is based further on at least one of a modulation and coding scheme assigned for transmission of the one or more data signals, cross link interference reported from the first wireless communications devices, or SNR reported from first wireless communications device.

While the techniques provided above are discussed in relation to the network entity 802 (e.g., BS 102) and first wireless communications device 804 (e.g., UE 104), these techniques may also be used by other types of devices within a network, such as by a base station (or disaggregated base station) and a repeater device or by a first sidelink UE and a second sidelink UE, etc.

Example Operations of a User Equipment

Figure 9:
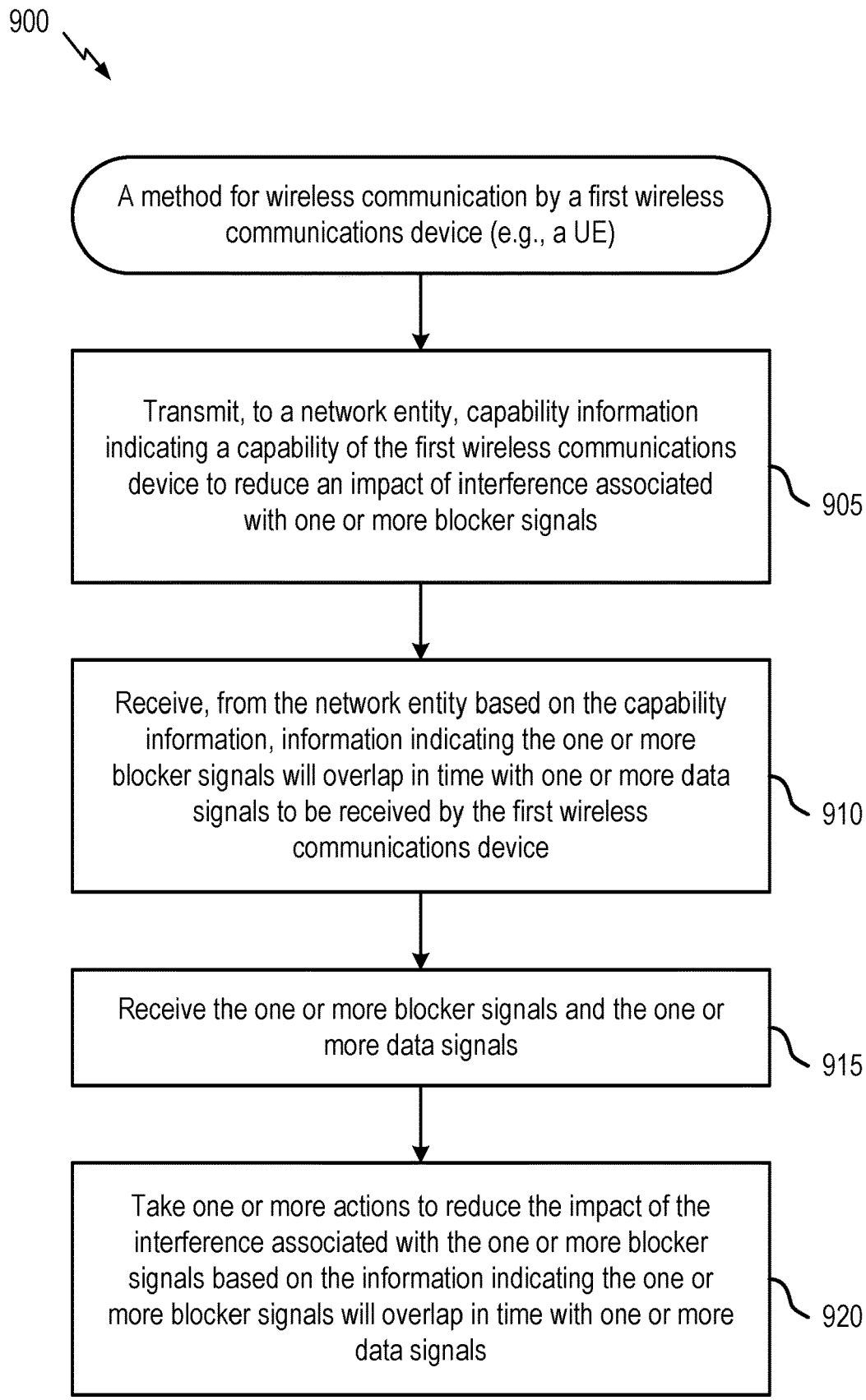
FIG. 9 depicts a method for wireless communications.

FIG. 9 shows an example of a method 900 of wireless communication by a first wireless communications device, such as a UE 104 of FIGS. 1 and 3.

Method 900 begins at step 905 with transmitting, to a network entity, capability information indicating a capability of the first wireless communications device to reduce an impact of interference associated with one or more blocker signals. In some cases, the operations of this step refer to, or may be performed by, circuitry for transmitting and/or code for transmitting as described with reference to FIG. 11.

Method 900 then proceeds to step 910 with receiving, from the network entity based on the capability information, information indicating the one or more blocker signals are scheduled to overlap in time with one or more data signals to be received by the first wireless communications device. In some cases, the operations of this step refer to, or may be performed by, circuitry for receiving and/or code for receiving as described with reference to FIG. 11.

Method 900 then proceeds to step 915 with receiving the one or more blocker signals and the one or more data signals. In some cases, the operations of this step refer to, or may be performed by, circuitry for receiving and/or code for receiving as described with reference to FIG. 11.

Method 900 then proceeds to step 920 with taking one or more actions to reduce the impact of the interference associated with the one or more blocker signals based on the information indicating the one or more blocker signals are scheduled to overlap in time with one or more data signals. In some cases, the operations of this step refer to, or may be performed by, circuitry for taking one or more actions and/or code for taking one or more actions as described with reference to FIG. 11.

In some aspects, the capability information further indicates a maximum bandwidth in which the first wireless communications device is capable of receiving the one or more blocker signals and reducing the impact of the interference.

In some aspects, the maximum bandwidth is one of: indicated as centered around a center frequency associated with the one or more data signals to be received by the first wireless communications device; or indicated as an absolute value above and below a center frequency associated with the one or more data signals to be received by the first wireless communications device.

In some aspects, the capability information further indicates a power threshold relative to a power associated with the one or more data signals to be received by the first wireless communications device and above which the first wireless communications device is configured to take one or more actions to reduce the impact of the interference associated with the one or more blocker signals.

In some aspects, information indicating the one or more blocker signals further comprises at least one of: a length of time that the one or more blocker signals will be transmitted; a power of the one or more blocker signals relative to a power of the one or more data signals to be received the first wireless communications device; a frequency location that the one or more blocker signals will be transmitted; or an indication that the one or more blocker signals will be transmitted within a particular bandwidth around the one or more data signals to be received by the first wireless communications device.

In some aspects, the length of time that the one or more blocker signals will be transmitted is indicated as a number of slots.

In some aspects, the number of slots are discontinuous.

In some aspects, the number of slots are semi-persistently scheduled or periodically scheduled.

In some aspects, taking the one or more actions to receive the one or more data signals comprises: increasing a bandwidth associated with a baseband filter of an analog front end (AFE) of the first wireless communications device to include the one or more blocker signals; and increasing a sampling rate of an analog-to-digital converter of the AFE of the first wireless communications device.

In some aspects, increasing the bandwidth associated with a baseband filter allows the one or more blocker signals to not be filtered out by the AFE from a bandwidth associated with the one or more data signals to be received by the first wireless communications device.

In some aspects, taking the one or more actions to reduce the impact of the interference associated with the one or more blocker signals comprises: linearizing a non-linear response of the AFE caused the one or more blocker signals; and reducing the impact of the interference associated with the one or more blocker signals caused to the one or more data signals based on the linearizing non-linear response of the AFE.

In some aspects, the method 900 further includes receiving, from the network entity, a request for feedback indicating whether the first wireless communications device was successful in reducing the impact of the interference associated with the one or more blocker signals. In some cases, the operations of this step refer to, or may be performed by, circuitry for receiving and/or code for receiving as described with reference to FIG. 11.

In some aspects, the method 900 further includes transmitting the feedback to the network entity, wherein the feedback indicates: a signal-to-noise ratio (SNR) associated with the one or more data signals after linearizing the non-linear response of the AFE and reducing the impact of the interference associated with the one or more blocker signals, and an SNR associated with the one or more data signals prior to the linearizing non-linear response of the AFE and reducing the impact of the interference associated with the one or more blocker signals. In some cases, the operations of this step refer to, or may be performed by, circuitry for transmitting and/or code for transmitting as described with reference to FIG. 11.

Figure 11:
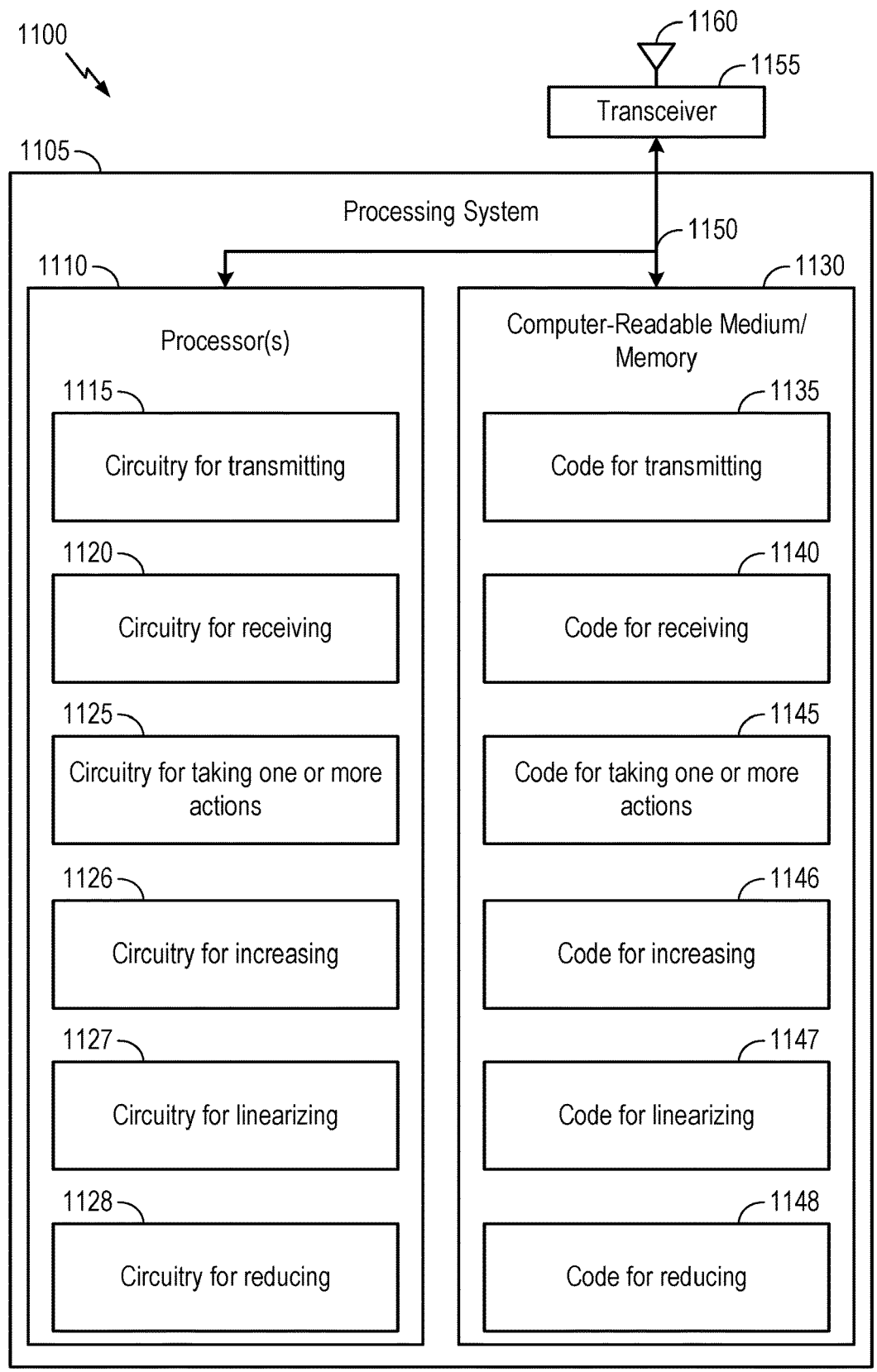
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a Network Entity

Figure 10:
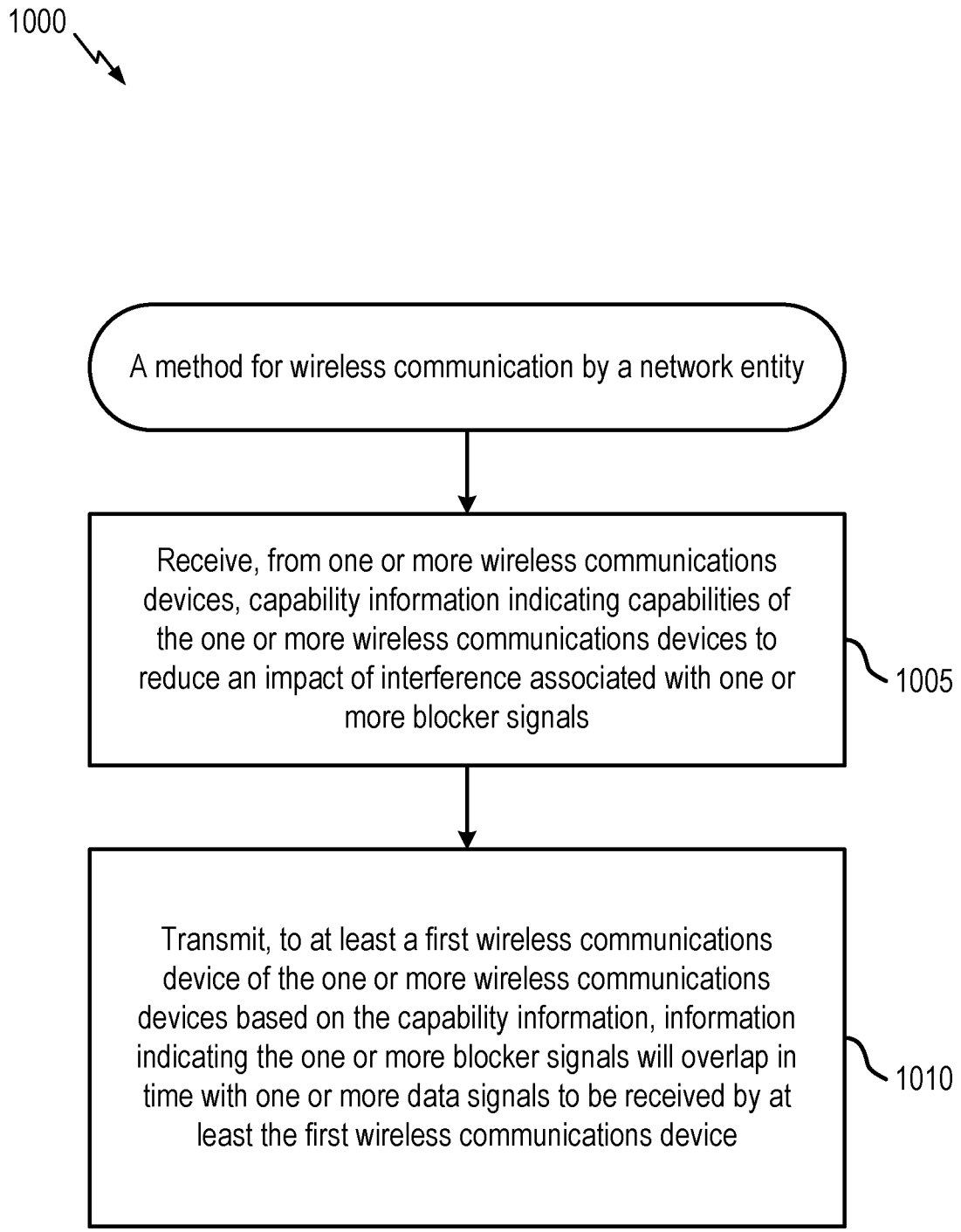
FIG. 10 depicts a method for wireless communications.

FIG. 10 shows an example of a method 1000 of wireless communication by a network entity, such as a BS 102 of FIGS. 1 and 3, or a disaggregated base station as discussed with respect to FIG. 2.

Method 1000 begins at step 1005 with receiving, from one or more wireless communications devices, capability information indicating capabilities of the one or more wireless communications devices to reduce an impact of interference associated with one or more blocker signals. In some cases, the operations of this step refer to, or may be performed by, circuitry for receiving and/or code for receiving as described with reference to FIG. 12.

Method 1000 then proceeds to step 1010 with transmitting, to at least a first wireless communications device of the one or more wireless communications devices based on the capability information, information indicating the one or more blocker signals are scheduled to overlap in time with one or more data signals to be received by at least the first wireless communications device. In some cases, the operations of this step refer to, or may be performed by, circuitry for transmitting and/or code for transmitting as described with reference to FIG. 12.

In some aspects, the capability information further indicates a maximum bandwidth in which the first wireless communications device is capable of receiving the one or more blocker signals and reducing the impact of the interference; and a power threshold relative to a power associated with the one or more data signals to be received by the first wireless communications device and above which the first wireless communications device is configured to take one or more actions to reduce the impact of the interference associated with the one or more blocker signals.

In some aspects, the maximum bandwidth is one of: indicated as centered around a center frequency associated with the one or more data signals to be received by the first wireless communications device; or indicated as an absolute value above and below a center frequency associated with the one or more data signals to be received by the first wireless communications device.

In some aspects, the method 1000 further includes determining that the one or more blocker signals will be transmitted within the maximum bandwidth and above the power threshold, wherein transmitting the information indicating the one or more blocker signals are scheduled to overlap in time with one or more data signals is based on the determination. In some cases, the operations of this step refer to, or may be performed by, circuitry for determining and/or code for determining as described with reference to FIG. 12.

In some aspects, information indicating the one or more blocker signals further comprises at least one of: a length of time that the one or more blocker signals will be transmitted; a power of the one or more blocker signals relative to a power of the one or more data signals to be received the first wireless communications device; a frequency location that the one or more blocker signals will be transmitted; or an indication that the one or more blocker signals will be transmitted within a particular bandwidth around the one or more data signals to be received by the first wireless communications device.

In some aspects, the length of time that the one or more blocker signals will be transmitted is indicated as a number of slots.

In some aspects, the number of slots are discontinuous.

In some aspects, the number of slots are semi-persistently scheduled or periodically scheduled.

In some aspects, the information indicating the one or more blocker signals are scheduled to overlap in time with one or more data signals indicates to the first wireless communications device to: increase a bandwidth associated with a baseband filter of an analog front end (AFE) of the first wireless communications device to include the one or more blocker signals; and increase a sampling rate of an analog-to-digital converter of the AFE of the first wireless communications device.

In some aspects, increasing the bandwidth associated with a baseband filter allows the one or more blocker signals to not be filtered out by the AFE from a bandwidth associated with the one or more data signals.

In some aspects, the information indicating the one or more blocker signals are scheduled to overlap in time with one or more data signals indicates to the first wireless communications device to: linearize a non-linear response of the AFE caused by the one or more blocker signals; and reduce the impact of the interference associated with the one or more blocker signals caused to the one or more data signals based on linearization of the non-linear response of the AFE.

In some aspects, the method 1000 further includes transmitting, to the first wireless communications device, a request for feedback indicating whether the first wireless communications device was successful in reducing the impact of the interference associated with the one or more blocker signals. In some cases, the operations of this step refer to, or may be performed by, circuitry for transmitting and/or code for transmitting as described with reference to FIG. 12.

In some aspects, the method 1000 further includes receiving the feedback from the first wireless communications device, wherein the feedback indicates: a signal-to-noise ratio (SNR) associated with the one or more data signals after linearization of a non-linear response of an analog front end (AFE) of the first wireless communications device and reducing the impact of the interference associated with the one or more blocker signals, and an SNR associated with the one or more data signals prior to the linearization of the non-linear response of the AFE of the first wireless communications device and reducing the impact of the interference associated with the one or more blocker signals. In some cases, the operations of this step refer to, or may be performed by, circuitry for receiving and/or code for receiving as described with reference to FIG. 12.

In some aspects, the method 1000 further includes scheduling the one or more data signals for the first wireless communications device based on the capability information. In some cases, the operations of this step refer to, or may be performed by, circuitry for scheduling and/or code for scheduling as described with reference to FIG. 12.

In some aspects, scheduling the one or more data signals for the first wireless communications device is based further on at least one of: a modulation and coding scheme assigned for transmission of the one or more data signals; cross link interference reported from the first wireless communications devices; or an signal-to-noise ratio (SNR) reported from first wireless communications device.

In some aspects, when, based on the capability information, the first wireless communications device is capable of reducing the impact of interference associated with one or more blocker signals, scheduling the one or more data signals for the first wireless communications device comprises scheduling the one or more data signals on frequency resources adjacent frequency resources used for transmission of the one or more blocker signals in frequency; and when, based on the capability information, the first wireless communications device is not capable of reducing the impact of interference associated with one or more blocker signals, scheduling the one or more data signals for the first wireless communications device comprises scheduling the one or more data signals on frequency resources to be non-adjacent to the frequency resources used for transmission of the one or more blocker signals in frequency.

In some aspects, the method 1000 further includes receiving the information indicating the one or more blocker signals from another network entity associated with a different cell relative to the network entity. In some cases, the operations of this step refer to, or may be performed by, circuitry for receiving and/or code for receiving as described with reference to FIG. 12.

Figure 12:
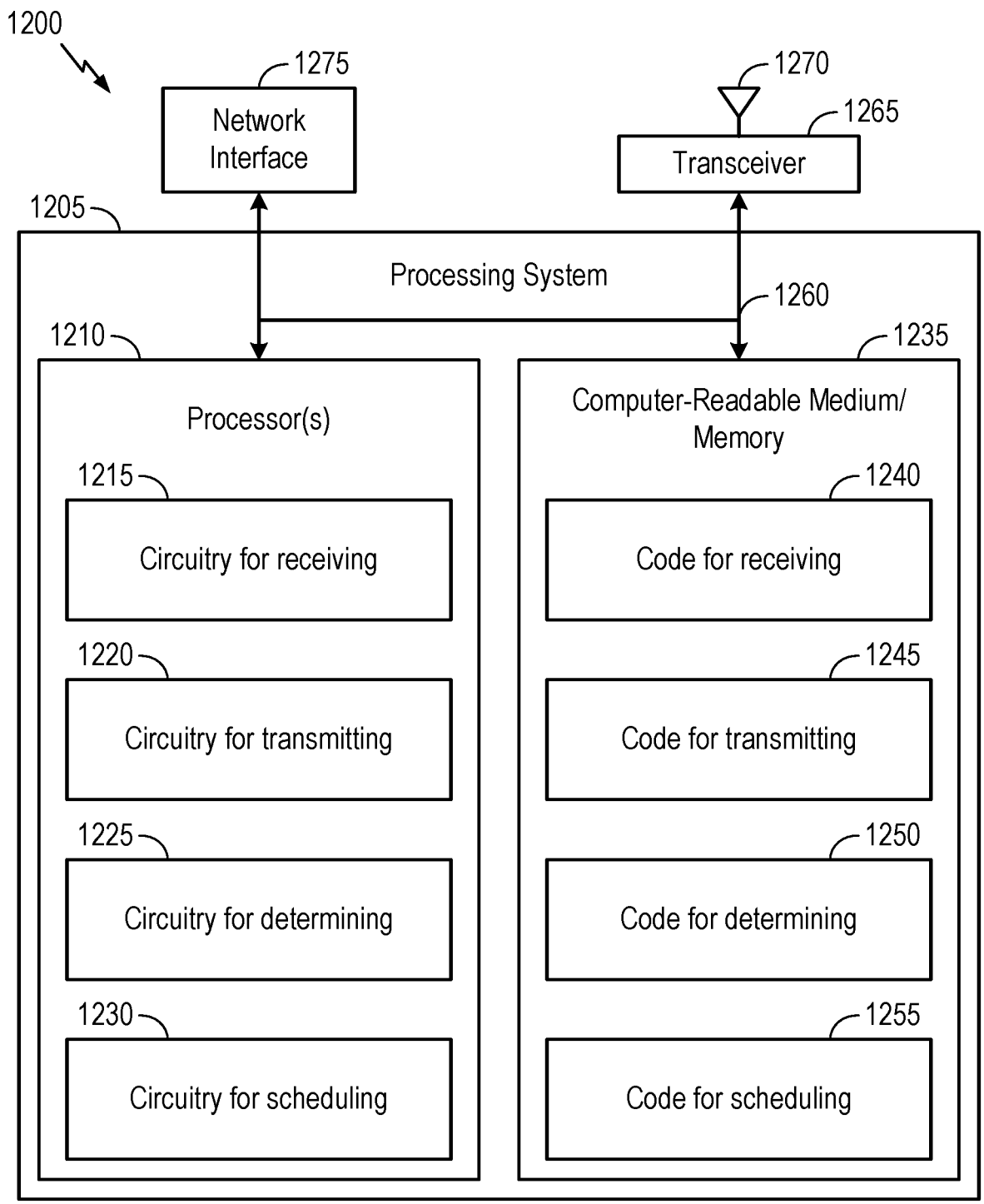
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Communications Device(s)

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to the transceiver 1155 (e.g., a transmitter and/or a receiver). The transceiver 1155 is configured to transmit and receive signals for the communications device 1100 via the antenna 1160, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1130 via a bus 1150. In certain aspects, the computer-readable medium/memory 1130 is configured to store instructions (e.g., computer-executable code) that when executed by the one or more processors 1110, cause the one or more processors 1110 to perform the method 900 described with respect to FIG. 9, or any aspect related to it. Note that reference to a processor performing a function of communications device 1100 may include one or more processors 1110 performing that function of communications device 1100.

In the depicted example, computer-readable medium/memory 1130 stores code (e.g., executable instructions), such as code for transmitting 1135, code for receiving 1140, code for taking one or more actions 1145, code for increasing 1146, code for linearizing 1147, and code for reducing 1148. Processing of the code for transmitting 1135, code for receiving 1140, code for taking one or more actions 1145, code for increasing 1146, code for linearizing 1147, and code for reducing 1148 may cause the communications device 1100 to perform the method 900 described with respect to FIG. 9, or any aspect related to it.

The one or more processors 1110 include circuitry configured to implement (e.g., execute) the code stored in the computer-readable medium/memory 1130, including circuitry such as circuitry for transmitting 1115, circuitry for receiving 1120, circuitry for taking one or more actions 1125, circuitry for increasing 1126, circuitry for linearizing 1127, and circuitry for reducing 1128. Processing with circuitry for transmitting 1115, circuitry for receiving 1120, circuitry for taking one or more actions 1125, circuitry for increasing 1126, circuitry for linearizing 1127, and circuitry for reducing 1128 may cause the communications device 1100 to perform the method 900 described with respect to FIG. 9, or any aspect related to it.

Various components of the communications device 1100 may provide means for performing the method 900 described with respect to FIG. 9, or any aspect related to it. For example, means for transmitting, sending or outputting for transmission may include transceivers 354 and/or antenna(s) 352 of the UE 104 illustrated in FIG. 3 and/or the transceiver 1155 and the antenna 1160 of the communications device 1100 in FIG. 11. Means for receiving or obtaining may include transceivers 354 and/or antenna(s) 352 of the UE 104 illustrated in FIG. 3 and/or the transceiver 1155 and the antenna 1160 of the communications device 1100 in FIG. 11.

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1205 coupled to the transceiver 1265 (e.g., a transmitter and/or a receiver) and/or a network interface 1275. The transceiver 1265 is configured to transmit and receive signals for the communications device 1200 via the antenna 1270, such as the various signals as described herein. The network interface 1275 is configured to obtain and send signals for the communications device 1200 via communication link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1235 via a bus 1260. In certain aspects, the computer-readable medium/memory 1235 is configured to store instructions (e.g., computer-executable code) that when executed by the one or more processors 1210, cause the one or more processors 1210 to perform the method 1000 described with respect to FIG. 10, or any aspect related to it. Note that reference to a processor of communications device 1200 performing a function may include one or more processors 1210 of communications device 1200 performing that function.

In the depicted example, the computer-readable medium/memory 1235 stores code (e.g., executable instructions), such as code for receiving 1240, code for transmitting 1245, code for determining 1250, and code for scheduling 1255. Processing of the code for receiving 1240, code for transmitting 1245, code for determining 1250, and code for scheduling 1255 may cause the communications device 1200 to perform the method 1000 described with respect to FIG. 10, or any aspect related to it.

The one or more processors 1210 include circuitry configured to implement (e.g., execute) the code stored in the computer-readable medium/memory 1235, including circuitry such as circuitry for receiving 1215, circuitry for transmitting 1220, circuitry for determining 1225, and circuitry for scheduling 1230. Processing with circuitry for receiving 1215, circuitry for transmitting 1220, circuitry for determining 1225, and circuitry for scheduling 1230 may cause the communications device 1200 to perform the method 1000 described with respect to FIG. 10, or any aspect related to it.

Various components of the communications device 1200 may provide means for performing the method 1000 described with respect to FIG. 10, or any aspect related to it. Means for transmitting, sending or outputting for transmission may include transceivers 332 and/or antenna(s) 334 of the BS 102 illustrated in FIG. 3 and/or the transceiver 1265 and the antenna 1270 of the communications device 1200 in FIG. 12. Means for receiving or obtaining may include transceivers 332 and/or antenna(s) 334 of the BS 102 illustrated in FIG. 3 and/or the transceiver 1265 and the antenna 1270 of the communications device 1200 in FIG. 12.

Example Clauses

Implementation examples are described in the following numbered clauses:

Clause 1: A method for wireless communication by a first wireless communications device, comprising: transmitting, to a network entity, capability information indicating a capability of the first wireless communications device to reduce an impact of interference associated with one or more blocker signals; receiving, from the network entity based on the capability information, information indicating the one or more blocker signals are scheduled to overlap in time with one or more data signals to be received by the first wireless communications device; receiving the one or more blocker signals and the one or more data signals; and taking one or more actions to reduce the impact of the interference associated with the one or more blocker signals based on the information indicating the one or more blocker signals are scheduled to overlap in time with one or more data signals.

Clause 2: The method of Clause 1, wherein the capability information further indicates a maximum bandwidth in which the first wireless communications device is capable of receiving the one or more blocker signals and reducing the impact of the interference.

Clause 3: The method of Clause 2, wherein the maximum bandwidth is one of: indicated as centered around a center frequency associated with the one or more data signals to be received by the first wireless communications device; or indicated as an absolute value above and below a center frequency associated with the one or more data signals to be received by the first wireless communications device.

Clause 4: The method of any one of Clauses 1-3, wherein the capability information further indicates a power threshold relative to a power associated with the one or more data signals to be received by the first wireless communications device and above which the first wireless communications device is configured to take one or more actions to reduce the impact of the interference associated with the one or more blocker signals.

Clause 5: The method of any one of Clauses 1-4, wherein information indicating the one or more blocker signals further comprises at least one of: a length of time that the one or more blocker signals will be transmitted; a power of the one or more blocker signals relative to a power of the one or more data signals to be received the first wireless communications device; a frequency location that the one or more blocker signals will be transmitted; or an indication that the one or more blocker signals will be transmitted within a particular bandwidth around the one or more data signals to be received by the first wireless communications device.

Clause 6: The method of Clause 5, wherein the length of time that the one or more blocker signals will be transmitted is indicated as a number of slots.

Clause 7: The method of Clause 6, wherein the number of slots are discontinuous.

Clause 8: The method of Clause 6, wherein the number of slots are semi-persistently scheduled or periodically scheduled.

Clause 9: The method of any one of Clauses 1-8, wherein taking the one or more actions to receive the one or more data signals comprises: increasing a bandwidth associated with a baseband filter of an analog front end (AFE) of the first wireless communications device to include the one or more blocker signals; and increasing a sampling rate of an analog-to-digital converter of the AFE of the first wireless communications device.

Clause 10: The method of Clause 9, wherein increasing the bandwidth associated with a baseband filter allows the one or more blocker signals to not be filtered out by the AFE from a bandwidth associated with the one or more data signals to be received by the first wireless communications device.

Clause 11: The method of Clause 9, wherein taking the one or more actions to reduce the impact of the interference associated with the one or more blocker signals comprises: linearizing a non-linear response of the AFE caused the one or more blocker signals; and reducing the impact of the interference associated with the one or more blocker signals caused to the one or more data signals based on the linearizing non-linear response of the AFE.

Clause 12: The method of Clause 11, further comprising receiving, from the network entity, a request for feedback indicating whether the first wireless communications device was successful in reducing the impact of the interference associated with the one or more blocker signals.

Clause 13: The method of Clause 12, further comprising transmitting the feedback to the network entity, wherein the feedback indicates: a signal-to-noise ratio (SNR) associated with the one or more data signals after linearizing the non-linear response of the AFE and reducing the impact of the interference associated with the one or more blocker signals, and an SNR associated with the one or more data signals prior to the linearizing non-linear response of the AFE and reducing the impact of the interference associated with the one or more blocker signals.

Clause 14: A method for wireless communication by a network entity, comprising: receiving, from one or more wireless communications devices, capability information indicating capabilities of the one or more wireless communications devices to reduce an impact of interference associated with one or more blocker signals; and transmitting, to at least a first wireless communications device of the one or more wireless communications devices based on the capability information, information indicating the one or more blocker signals are scheduled to overlap in time with one or more data signals to be received by at least the first wireless communications device.

Clause 15: The method of Clause 14, wherein: the capability information further indicates a maximum bandwidth in which the first wireless communications device is capable of receiving the one or more blocker signals and reducing the impact of the interference; and a power threshold relative to a power associated with the one or more data signals to be received by the first wireless communications device and above which the first wireless communications device is configured to take one or more actions to reduce the impact of the interference associated with the one or more blocker signals.

Clause 16: The method of Clause 15, wherein the maximum bandwidth is one of: indicated as centered around a center frequency associated with the one or more data signals to be received by the first wireless communications device; or indicated as an absolute value above and below a center frequency associated with the one or more data signals to be received by the first wireless communications device.

Clause 17: The method of Clause 15, further comprising determining that the one or more blocker signals will be transmitted within the maximum bandwidth and above the power threshold, wherein transmitting the information indicating the one or more blocker signals are scheduled to overlap in time with one or more data signals is based on the determination.

Clause 18: The method of any one of Clauses 14-17, wherein information indicating the one or more blocker signals further comprises at least one of: a length of time that the one or more blocker signals will be transmitted; a power of the one or more blocker signals relative to a power of the one or more data signals to be received the first wireless communications device; a frequency location that the one or more blocker signals will be transmitted; or an indication that the one or more blocker signals will be transmitted within a particular bandwidth around the one or more data signals to be received by the first wireless communications device.

Clause 19: The method of Clause 18, wherein the length of time that the one or more blocker signals will be transmitted is indicated as a number of slots.

Clause 20: The method of Clause 19, wherein the number of slots are discontinuous.

Clause 21: The method of Clause 19, wherein the number of slots are semi-persistently scheduled or periodically scheduled.

Clause 22: The method of any one of Clauses 14-21, wherein the information indicating the one or more blocker signals are scheduled to overlap in time with one or more data signals indicates to the first wireless communications device to: increase a bandwidth associated with a baseband filter of an analog front end (AFE) of the first wireless communications device to include the one or more blocker signals; and increase a sampling rate of an analog-to-digital converter of the AFE of the first wireless communications device.

Clause 23: The method of Clause 22, wherein increasing the bandwidth associated with a baseband filter allows the one or more blocker signals to not be filtered out by the AFE from a bandwidth associated with the one or more data signals.

Clause 24: The method of Clause 22, wherein the information indicating the one or more blocker signals are scheduled to overlap in time with one or more data signals indicates to the first wireless communications device to: linearize a non-linear response of the AFE caused by the one or more blocker signals; and reduce the impact of the interference associated with the one or more blocker signals caused to the one or more data signals based on linearization of the non-linear response of the AFE.

Clause 25: The method of Clause 24, further comprising transmitting, to the first wireless communications device, a request for feedback indicating whether the first wireless communications device was successful in reducing the impact of the interference associated with the one or more blocker signals.

Clause 26: The method of Clause 25, further comprising receiving the feedback from the first wireless communications device, wherein the feedback indicates: a signal-to-noise ratio (SNR) associated with the one or more data signals after linearization of a non-linear response of an analog front end (AFE) of the first wireless communications device and reducing the impact of the interference associated with the one or more blocker signals, and an SNR associated with the one or more data signals prior to the linearization of the non-linear response of the AFE of the first wireless communications device and reducing the impact of the interference associated with the one or more blocker signals.

Clause 27: The method of any one of Clauses 14-26, further comprising scheduling the one or more data signals for the first wireless communications device based on the capability information.

Clause 28: The method of Clause 27, wherein scheduling the one or more data signals for the first wireless communications device is based further on at least one of: a modulation and coding scheme assigned for transmission of the one or more data signals; cross link interference reported from the first wireless communications devices; or an signal-to-noise ratio (SNR) reported from first wireless communications device.

Clause 29: The method of Clause 27, wherein: when, based on the capability information, the first wireless communications device is capable of reducing the impact of interference associated with one or more blocker signals, scheduling the one or more data signals for the first wireless communications device comprises scheduling the one or more data signals on frequency resources adjacent frequency resources used for transmission of the one or more blocker signals in frequency; and when, based on the capability information, the first wireless communications device is not capable of reducing the impact of interference associated with one or more blocker signals, scheduling the one or more data signals for the first wireless communications device comprises scheduling the one or more data signals on frequency resources to be non-adjacent to the frequency resources used for transmission of the one or more blocker signals in frequency.

Clause 30: The method of any one of Clauses 14-29, further comprising receiving the information indicating the one or more blocker signals from another network entity associated with a different cell relative to the network entity.

Clause 31: An apparatus, comprising: one or more memories; and one or more processors configured to cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by a processor of an apparatus, cause the apparatus to perform a method in accordance with any one of Clauses 1-30.

Clause 34: A computer program product embodied on a computer-readable storage medium comprising code for performing a method in accordance with any one of Clauses 1-30.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first wireless communications device, comprising:
    transmitting, to a network entity, capability information indicating a capability of the first wireless communications device to reduce an impact of interference associated with one or more blocker signals;
    receiving, from the network entity based on the capability information, information indicating the one or more blocker signals are scheduled to overlap in time with one or more data signals to be received by the first wireless communications device;
    receiving the one or more blocker signals and the one or more data signals; and
    taking one or more actions to reduce the impact of the interference associated with the one or more blocker signals based on the information indicating the one or more blocker signals are scheduled to overlap in time with one or more data signals.

2. The method of claim 1, wherein the capability information further indicates a maximum bandwidth in which the first wireless communications device is capable of receiving the one or more blocker signals and reducing the impact of the interference.

3. The method of claim 2, wherein the maximum bandwidth is one of:
  indicated as centered around a center frequency associated with the one or more data signals to be received by the first wireless communications device; or
  indicated as an absolute value above and below a center frequency associated with the one or more data signals to be received by the first wireless communications device.

4. The method of claim 1, wherein the capability information further indicates a power threshold relative to a power associated with the one or more data signals to be received by the first wireless communications device and above which the first wireless communications device is configured to take one or more actions to reduce the impact of the interference associated with the one or more blocker signals.

5. The method of claim 1, wherein information indicating the one or more blocker signals further comprises at least one of:
  a length of time that the one or more blocker signals will be transmitted;
  a power of the one or more blocker signals relative to a power of the one or more data signals to be received the first wireless communications device;
  a frequency location that the one or more blocker signals will be transmitted; or
  an indication that the one or more blocker signals will be transmitted within a particular bandwidth around the one or more data signals to be received by the first wireless communications device.

6. The method of claim 5, wherein the length of time that the one or more blocker signals will be transmitted is indicated as a number of slots.

7. The method of claim 6, wherein the number of slots are discontinuous.

8. The method of claim 6, wherein the number of slots are semi-persistently scheduled or periodically scheduled.

9. The method of claim 1, wherein taking the one or more actions to receive the one or more data signals comprises:
  increasing a bandwidth associated with a baseband filter of an analog front end (AFE) of the first wireless communications device to include the one or more blocker signals; and
  increasing a sampling rate of an analog-to-digital converter of the AFE of the first wireless communications device.

10. The method of claim 9, wherein increasing the bandwidth associated with a baseband filter allows the one or more blocker signals to not be filtered out by the AFE from a bandwidth associated with the one or more data signals to be received by the first wireless communications device.

11. The method of claim 9, wherein taking the one or more actions to reduce the impact of the interference associated with the one or more blocker signals comprises:
  linearizing a non-linear response of the AFE caused the one or more blocker signals; and
  reducing the impact of the interference associated with the one or more blocker signals caused to the one or more data signals based on the linearizing non-linear response of the AFE.

12. The method of claim 11, further comprising receiving, from the network entity, a request for feedback indicating whether the first wireless communications device was successful in reducing the impact of the interference associated with the one or more blocker signals.

13. The method of claim 12, further comprising transmitting the feedback to the network entity, wherein the feedback indicates:
  a signal-to-noise (SNR) ratio associated with the one or more data signals after linearizing the non-linear response of the AFE and reducing the impact of the interference associated with the one or more blocker signals; and
  an SNR associated with the one or more data signals prior to the linearizing non-linear response of the AFE and reducing the impact of the interference associated with the one or more blocker signals.

14. A method for wireless communication by a network entity, comprising:
  receiving, from one or more wireless communications devices, capability information indicating capabilities of the one or more wireless communications devices to reduce an impact of interference associated with one or more blocker signals; and
  transmitting, to at least a first wireless communications device of the one or more wireless communications devices based on the capability information, information indicating the one or more blocker signals are scheduled to overlap in time with one or more data signals to be received by at least the first wireless communications device.

15. The method of claim 14, wherein:
  the capability information further indicates a maximum bandwidth in which the first wireless communications device is capable of receiving the one or more blocker signals and reducing the impact of the interference; and
  a power threshold relative to a power associated with the one or more data signals to be received by the first wireless communications device and above which the first wireless communications device is configured to take one or more actions to reduce the impact of the interference associated with the one or more blocker signals.

16. The method of claim 15, wherein the maximum bandwidth is one of:
  indicated as centered around a center frequency associated with the one or more data signals to be received by the first wireless communications device; or
  indicated as an absolute value above and below a center frequency associated with the one or more data signals to be received by the first wireless communications device.

17. The method of claim 15, further comprising determining that the one or more blocker signals will be transmitted within the maximum bandwidth and above the power threshold, wherein transmitting the information indicating the one or more blocker signals are scheduled to overlap in time with one or more data signals is based on the determination.

18. The method of claim 14, wherein information indicating the one or more blocker signals further comprises at least one of:
  a length of time that the one or more blocker signals will be transmitted;
  a power of the one or more blocker signals relative to a power of the one or more data signals to be received the first wireless communications device;
  a frequency location that the one or more blocker signals will be transmitted; or
  an indication that the one or more blocker signals will be transmitted within a particular bandwidth around the one or more data signals to be received by the first wireless communications device.

19. The method of claim 18, wherein the length of time that the one or more blocker signals will be transmitted is indicated as a number of slots.

20. The method of claim 19, wherein the number of slots are discontinuous.

21. The method of claim 19, wherein the number of slots are semi-persistently scheduled or periodically scheduled.

22. The method of claim 14, wherein the information indicating the one or more blocker signals are scheduled to overlap in time with one or more data signals indicates to the first wireless communications device to:
increase a bandwidth associated with a baseband filter of an analog front end (AFE) of the first wireless communications device to include the one or more blocker signals; and
increase a sampling rate of an analog-to-digital converter of the AFE of the first wireless communications device.

23. The method of claim 22, wherein increasing the bandwidth associated with a baseband filter allows the one or more blocker signals to not be filtered out by the AFE from a bandwidth associated with the one or more data signals.

24. The method of claim 22, wherein the information indicating the one or more blocker signals are scheduled to overlap in time with one or more data signals indicates to the first wireless communications device to:
linearize a non-linear response of the AFE caused by the one or more blocker signals; and
reduce the impact of the interference associated with the one or more blocker signals caused to the one or more data signals based on linearization of the non-linear response of the AFE.

25. The method of claim 24, further comprising:
transmitting, to the first wireless communications device, a request for feedback indicating whether the first wireless communications device was successful in reducing the impact of the interference associated with the one or more blocker signals; and
receiving the feedback from the first wireless communications device, wherein the feedback indicates:
a signal-to-noise (SNR) ratio associated with the one or more data signals after linearization of a non-linear response of an analog front end (AFE) of the first wireless communications device and reducing the impact of the interference associated with the one or more blocker signals; and
an SNR associated with the one or more data signals prior to the linearization of the non-linear response of the AFE of the first wireless communications device and reducing the impact of the interference associated with the one or more blocker signals.

26. The method of claim 14, further comprising:
scheduling the one or more data signals for the first wireless communications device based on the capability information, wherein scheduling the one or more data signals for the first wireless communications device is based further on at least one of:
a modulation and coding scheme assigned for transmission of the one or more data signals;
cross link interference reported from the first wireless communications devices; or
an signal-to-noise ratio (SNR) reported from first wireless communications device.

27. The method of claim 26, wherein:
when, based on the capability information, the first wireless communications device is capable of reducing the impact of interference associated with one or more blocker signals, scheduling the one or more data signals for the first wireless communications device comprises scheduling the one or more data signals on frequency resources adjacent frequency resources used for transmission of the one or more blocker signals in frequency; and
when, based on the capability information, the first wireless communications device is not capable of reducing the impact of interference associated with one or more blocker signals, scheduling the one or more data signals for the first wireless communications device comprises scheduling the one or more data signals on frequency resources to be non-adjacent to the frequency resources used for transmission of the one or more blocker signals in frequency.

28. The method of claim 14, further comprising receiving the information indicating the one or more blocker signals from another network entity associated with a different cell relative to the network entity.

29. An apparatus for wireless communication, comprising:
one or more memories; and
one or more processors configured to cause the apparatus to:
transmit, to a network entity, capability information indicating a capability of the first wireless communications device to reduce an impact of interference associated with one or more blocker signals;
receive, from the network entity based on the capability information, information indicating the one or more blocker signals are scheduled to overlap in time with one or more data signals to be received by the first wireless communications device;
receive the one or more blocker signals and the one or more data signals; and
take one or more actions to reduce the impact of the interference associated with the one or more blocker signals based on the information indicating the one or more blocker signals are scheduled to overlap in time with one or more data signals.

30. An apparatus for wireless communication, comprising:
one or more memories; and
one or more processors configured to cause the apparatus to:
receive, from one or more wireless communications devices, capability information indicating capabilities of the one or more wireless communications devices to reduce an impact of interference associated with one or more blocker signals; and
transmit, to at least a first wireless communications device of the one or more wireless communications devices based on the capability information, information indicating the one or more blocker signals are scheduled to overlap in time with one or more data signals to be received by at least the first wireless communications device.

* * * * *